United States Patent
Takenaka et al.

(10) Patent No.: US 10,432,878 B2
(45) Date of Patent: Oct. 1, 2019

(54) IMAGING APPARATUS AND IMAGING SYSTEM HAVING LOGICAL CIRCUIT TO GENERATE PIXEL DRIVING SIGNALS

(71) Applicant: CANON KABUSHIKI KAISHA, Tokyo (JP)

(72) Inventors: Shintaro Takenaka, Yokohama (JP); Daisuke Yoshida, Ebina (JP); Noriyuki Shikina, Hachioji (JP); Yasuji Ikeda, Kawasaki (JP); Hidetoshi Hayashi, Fujisawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 143 days.

(21) Appl. No.: 15/632,022

(22) Filed: Jun. 23, 2017

(65) Prior Publication Data

US 2018/0007287 A1 Jan. 4, 2018

(30) Foreign Application Priority Data

Jun. 30, 2016 (JP) ................................ 2016-130906

(51) Int. Cl.
| | | |
|---|---|---|
| *H04N 5/3745* | (2011.01) | |
| *H04N 5/376* | (2011.01) | |
| *H04N 5/369* | (2011.01) | |
| *H04N 5/30* | (2006.01) | |
| *H04N 5/378* | (2011.01) | |

(52) U.S. Cl.
CPC ............ *H04N 5/30* (2013.01); *H04N 5/3765* (2013.01); *H04N 5/37455* (2013.01); *H04N 5/3698* (2013.01); *H04N 5/378* (2013.01)

(58) Field of Classification Search
None
See application file for complete search history.

(56) References Cited

U.S. PATENT DOCUMENTS

| | | | | |
|---|---|---|---|---|
| 8,723,997 B2 * | 5/2014 | Koh | ....................... | H03K 23/62 348/294 |
| 2011/0228122 A1 | 9/2011 | Takenaka | | |
| 2011/0285887 A1 | 11/2011 | Takenaka | | |

FOREIGN PATENT DOCUMENTS

| | | |
|---|---|---|
| JP | 2010-57097 A | 3/2010 |
| JP | 2016-103780 A | 6/2016 |

* cited by examiner

*Primary Examiner* — Mark T Monk
(74) *Attorney, Agent, or Firm* — Canon U.S.A., INC. IP Division

(57) ABSTRACT

An imaging apparatus includes a first holding circuit, a second holding circuit, and a calculator. The first holding circuit is configured to hold and output a logical value based on a logical value supplied from an address decoder. The second holding circuit is configured to hold and output a logical value based on the logical value output from the first holding circuit. The calculator is configured to receive the logical values supplied from the first and second holding circuits and perform a logical operation for generating a driving signal.

19 Claims, 17 Drawing Sheets

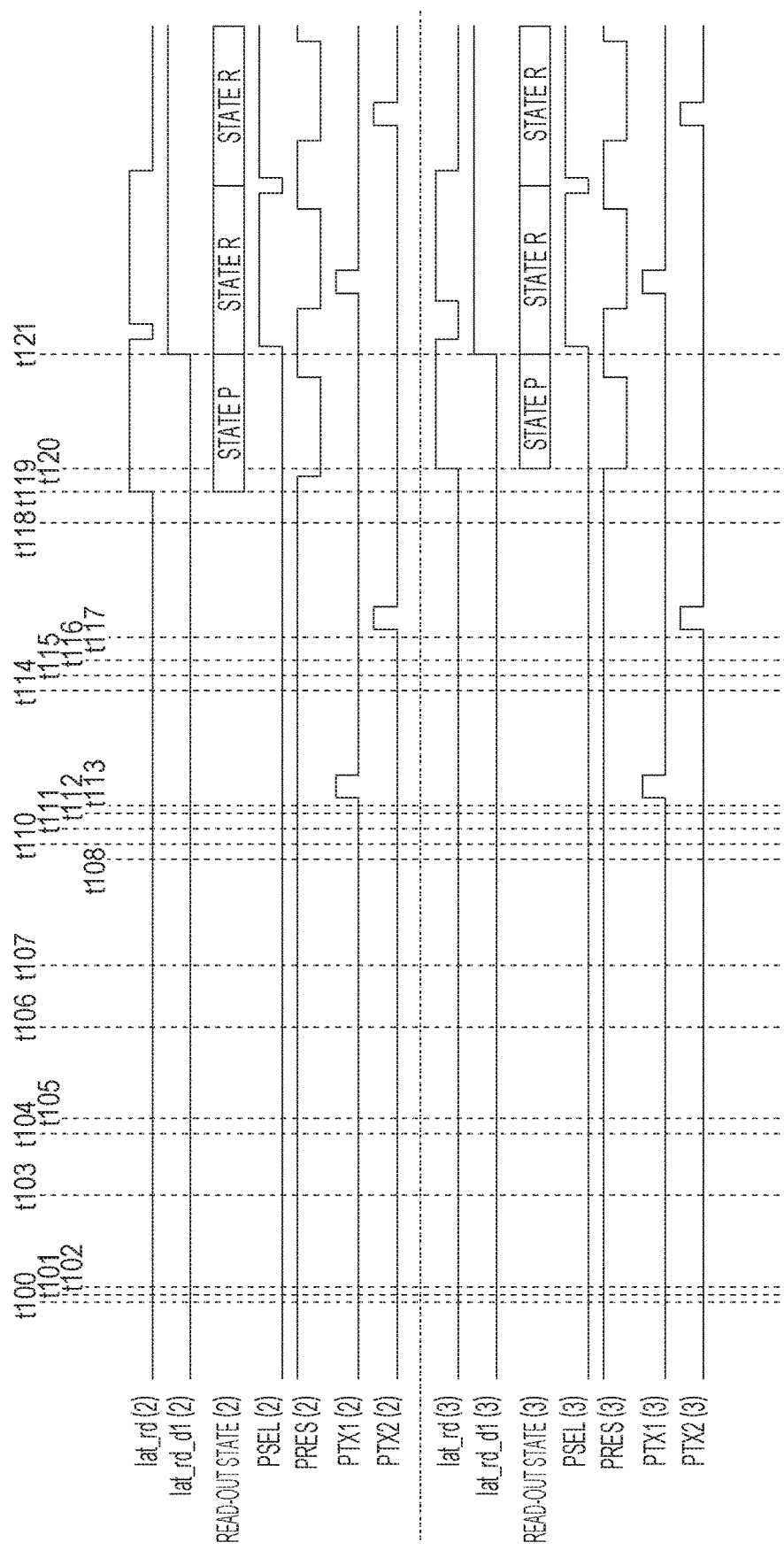

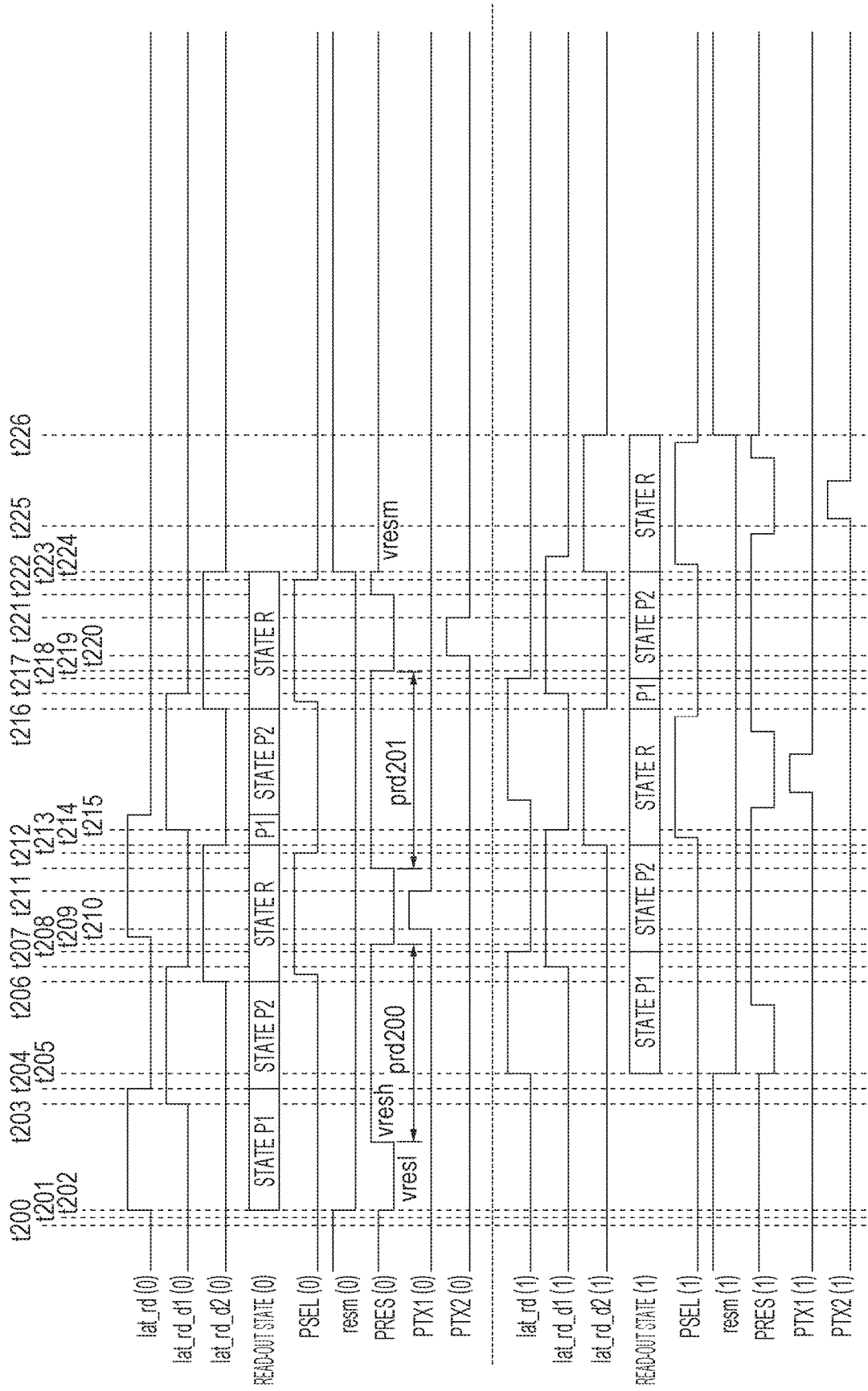

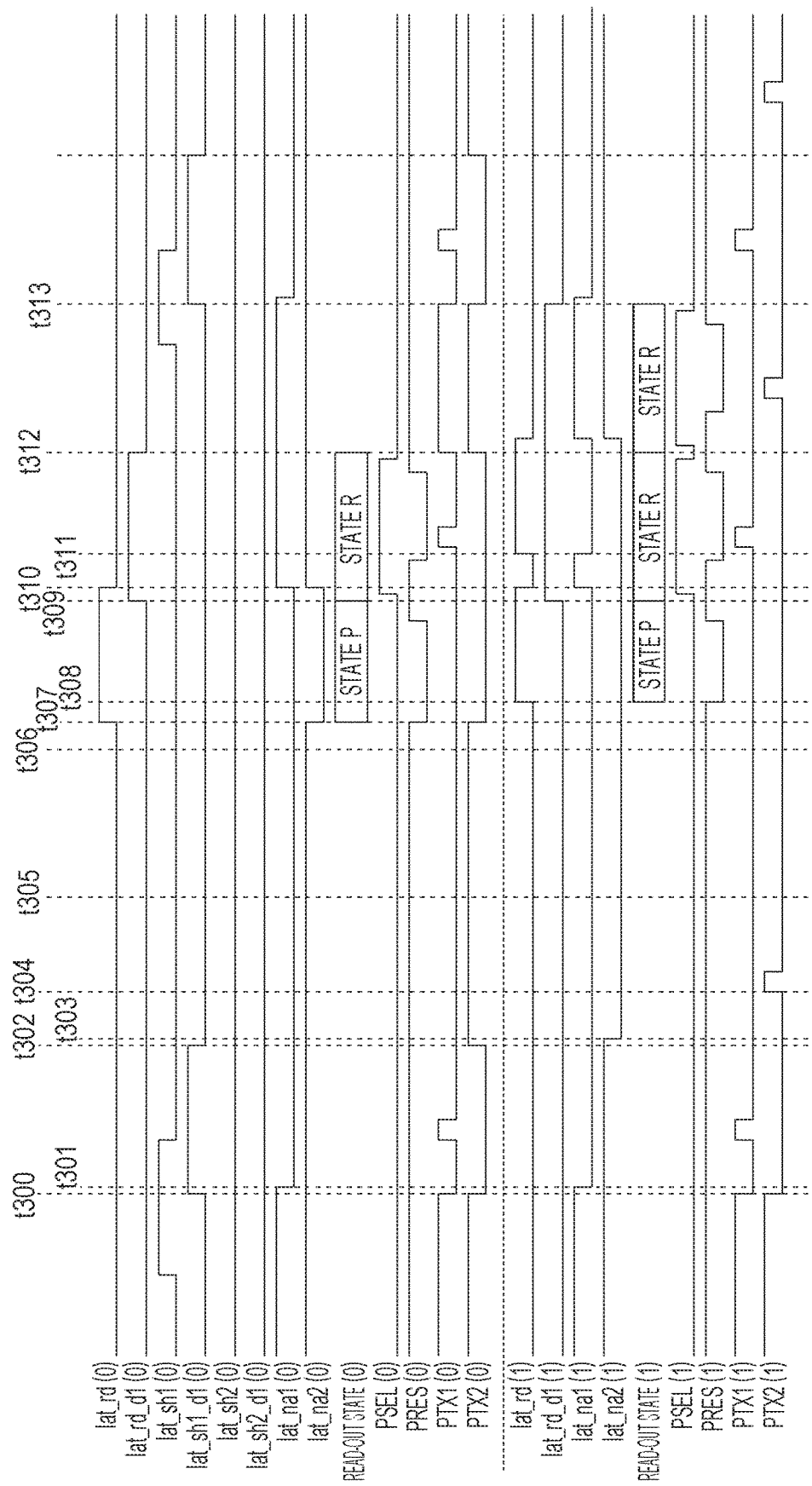

US 10,432,878 B2

IMAGING APPARATUS AND IMAGING SYSTEM HAVING LOGICAL CIRCUIT TO GENERATE PIXEL DRIVING SIGNALS

BACKGROUND OF THE INVENTION

Field of the Invention

The present disclosure relates to an imaging apparatus. In particular, one aspect of the embodiments is directed to generation of pixel driving signals.

Description of the Related Art

According to Japanese Patent Laid-Open No. 2010-57097, a vertical scanning circuit serving as a pixel driver includes a row decoder which specifies a shutter operation and a read-out operation on pixel circuits. The row decoder includes an address decoder which decodes an address signal, a plurality of memories connected to an output of the address decoder in series, and a logical gate connected to the memories. The address decoder specifies a row for the read-out operation. The memories specify a row for the shutter operation, and an output of the memories serves as a shutter control pulse.

The imaging apparatus disclosed in Japanese Patent Laid-Open No. 2010-57097 may not cope with various operations, and therefore, performance of the imaging apparatus may not be sufficiently improved.

SUMMARY OF THE INVENTION

According to an aspect of the present disclosure, an imaging apparatus includes a pixel area including a plurality of pixel circuit groups, a plurality of drivers, and an address decoder. Each of the plurality of pixel circuit groups includes a plurality of pixel circuits. The plurality of drivers is arranged so as to correspond to the different pixel circuit groups and configured to output driving signals to the corresponding pixel circuit groups. The address decoder is configured to supply logical values indicating selection or deselection of the individual drivers to the drivers. Each of the drivers includes a first holding circuit, a second holding circuit, and a calculator. The first holding circuit is configured to hold and output a logical value based on a logical value supplied from the address decoder. The second holding circuit is configured to hold and output a logical value based on the logical value output from the first holding circuit. The calculator is configured to receive the logical values supplied from the first and second holding circuits and perform a logical operation for generating one of the driving signals.

Further features of the disclosure will become apparent from the following description of exemplary embodiments with reference to the attached drawings.

BRIEF DESCRIPTION OF THE DRAWINGS

FIGS. 4A to 4C are a timing chart illustrating a method for driving the vertical scanner and a pixel area according to the first embodiment.

FIGS. 6A to 6C are a timing chart illustrating a method for driving the vertical scanner and a pixel area according to the second embodiment.

FIGS. 8A to 8C are a timing chart illustrating a method for driving the vertical scanner and a pixel area according to the third embodiment.

DESCRIPTION OF THE EMBODIMENTS

Figure 1A:
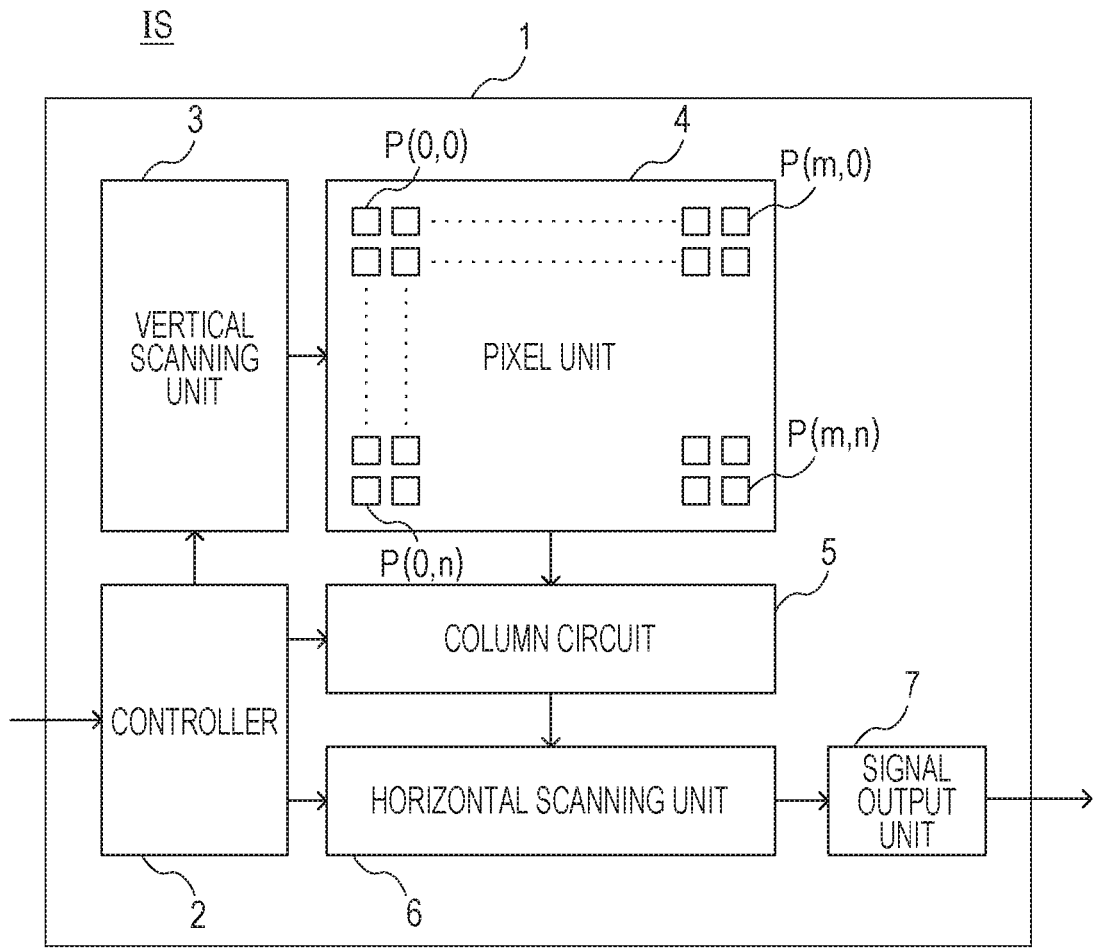
FIGS. 1A and 1B are diagrams schematically illustrating an imaging apparatus.

The present disclosure provides an imaging apparatus capable of providing operations which are advantageous in improvement of performance of the imaging apparatus.

Hereinafter, embodiments of the present disclosure will be described with reference to the accompanying drawings. Note that, in a description below and drawings, the same components in a plurality of drawings are denoted by the same reference numerals. Therefore, the same components are described mutually with reference to the plurality of drawings and redundant descriptions of the components having the same reference numerals are omitted where appropriate.

FIG. 1A is a block diagram schematically illustrating an imaging apparatus IS. The imaging apparatus IS includes a semiconductor substrate 1, a controller 2, a vertical scanner 3, a pixel area 4, a column circuit 5, a horizontal scanner 6, and a signal output circuit 7. The controller 2 operates in response to a control signal, such as a synchronization signal supplied from an external control apparatus and a signal for setting an operation mode or the like. The pixel area 4 includes a plurality of pixel circuits P(0, 0) to P(m, n) in a plurality of rows and a plurality of columns, that is, a matrix of (n+1) rows by (m+1) columns. Here, a row direction corresponds to a horizontal direction in the drawings, and a column direction corresponds to a vertical direction in the drawings. Furthermore, variables in a bracket in pixel circuits P(m, n) indicate a column number and a row number in this order. Furthermore, a row number in a top row is 0, and a column number of a top column is 0. A plurality of pixel circuits P included in the same row is determined as a pixel circuit group. A number of pixel circuit groups corresponding to a number of columns are arranged in the column direction.

The vertical scanner 3 performs read-out scan and electronic shutter scan on the pixel area 4 when receiving a control signal from the controller 2. The shutter scan is an operation of successively resetting photoelectric conversion elements of pixel circuits of a part of rows or all rows of the pixel area 4 before start of exposure. The read-out scan is an operation of successively output signals based on charge accumulated in the photoelectric conversion elements of pixel circuits of a part of the rows or all the rows of the pixel area 4. The column circuit 5 includes an amplification circuit, an analog/digital conversion (AD conversion) circuit, and a memory. The column circuit 5 amplifies a signal supplied from the pixel area 4, performs AD conversion on the signal, and stores the signal as a digital signal in the memory. When receiving the control signal supplied from the controller 2, the horizontal scanner 6 successively scans and outputs signals stored in the memory of the column circuit 5. The signal output circuit 7 includes a digital processor, a parallel/serial conversion circuit, and an output circuit, such as low voltage differential signaling (LVDS). The signal output circuit 7 performs digital processing on a signal output from the horizontal scanner 6 and outputs the signal as serial data to an outside of the imaging apparatus IS. Note that the column circuit 5 does not necessarily have an AD conversion function, and the configuration may be modified such that the AD conversion is performed outside the imaging apparatus IS. In this case, configurations of the horizontal scanner 6 and the signal output circuit 7 are also appropriately modified so as to be suitable for the processing performed on an analog signal.

Figure 1B:
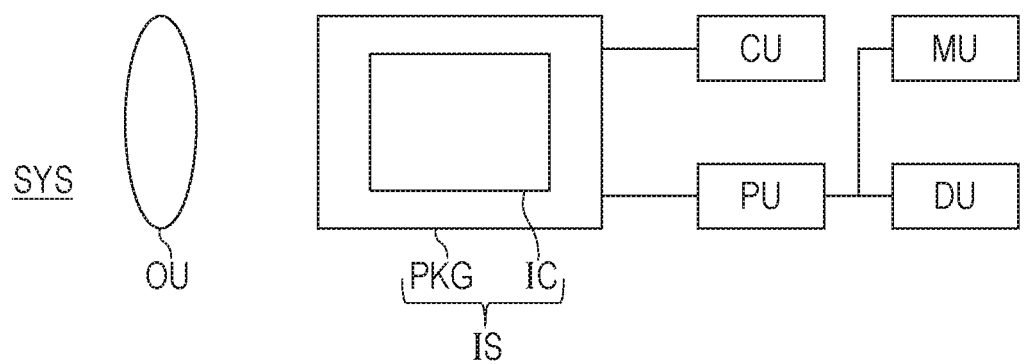
Figure 2:
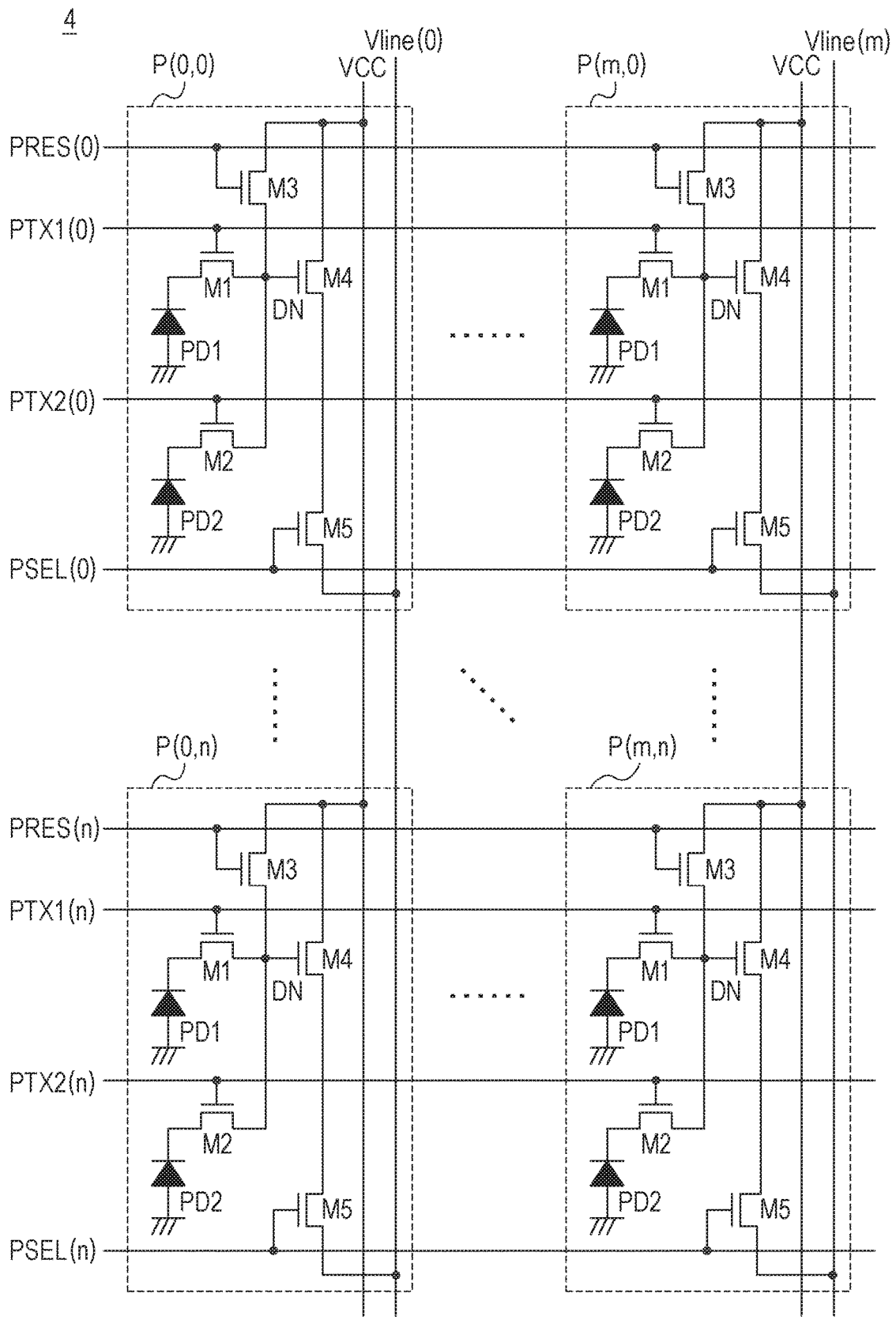
FIG. 2 is a diagram schematically illustrating the imaging apparatus.

The imaging apparatus IS will be described with reference to FIG. 1B. FIG. 1B is a diagram illustrating a configuration of an imaging system SYS constituted using the imaging apparatus IS. The imaging system SYS is an information terminal having a camera or an imaging function. The imaging apparatus IS may further include a package PKG which accommodates an imaging device IC. The package PKG may include a base body to which the imaging device IC is fixed, a lid body of glass or the like which faces the semiconductor substrate, and a connection member, such as bonding wire or a bump, which connects a terminal disposed on the base body to a terminal disposed on the imaging device IC. Note that, although all circuit blocks are disposed on the single semiconductor substrate 1 in the imaging device IC as a single chip in the example of FIG. 1A, the disclosure is not limited to this. For example, the imaging device IC may be formed by laminating an imaging chip having the pixel area 4 and a signal processing chip having at least one of the controller 2, the vertical scanner 3, the column circuit 5, the horizontal scanner 6, and the signal output circuit 7 disposed thereon. Furthermore, a portion of a certain circuit block may be disposed on the imaging chip, and a remaining portion of the circuit block may be disposed on the signal processing chip. For example, a storage for reading, a storage for accumulation, and a calculator which are included in a driver described below may be disposed on the signal processing chip and a level shifter may be disposed on the imaging chip.

The imaging system SYS may include an optical system OU which forms an image on the imaging apparatus IS. Furthermore, the imaging system SYS may include at least one of a control apparatus CU, a processing apparatus PU, a display apparatus DU, and a memory apparatus MU. The control apparatus CU controls the imaging apparatus IS. The processing apparatus PU processes a signal output from the imaging apparatus IS. The display apparatus DU displays an image obtained by the imaging apparatus IS, and the memory apparatus MU stores the image obtained by the imaging apparatus IS.

A signal PTX1(n) controls transfer transistors M1 in an n-th row and is supplied to gates of the transfer transistors M1. Similarly, a signal PTX2(n) controls transfer transistors M2 in the n-th row and is supplied to gates of the transfer transistors M2. A signal PRES(n) controls reset transistors M3 in the n-th row and is supplied to gates of the reset transistors M3. A signal PSEL(n) controls selection transistors M4 in the n-th row and is supplied to gates of the selection transistors M4. Each of the transistors is brought into a conductive state when a signal input to the gate is in a high level and into a non-conductive state when a signal input to the gate is in a low level. Furthermore, the high level corresponds to a logical value "1" and the low level corresponds to a logical value "0". Note that, in a description below, when P(0, n), PTX1(1), and so on which are distinguished from each other by "(0, n)", "(1)", and so on are arbitrarily referred to, "x" is used instead of specific values, such as "P(x, n)" and "PTX1(x)".

First Embodiment

Figure 3A:
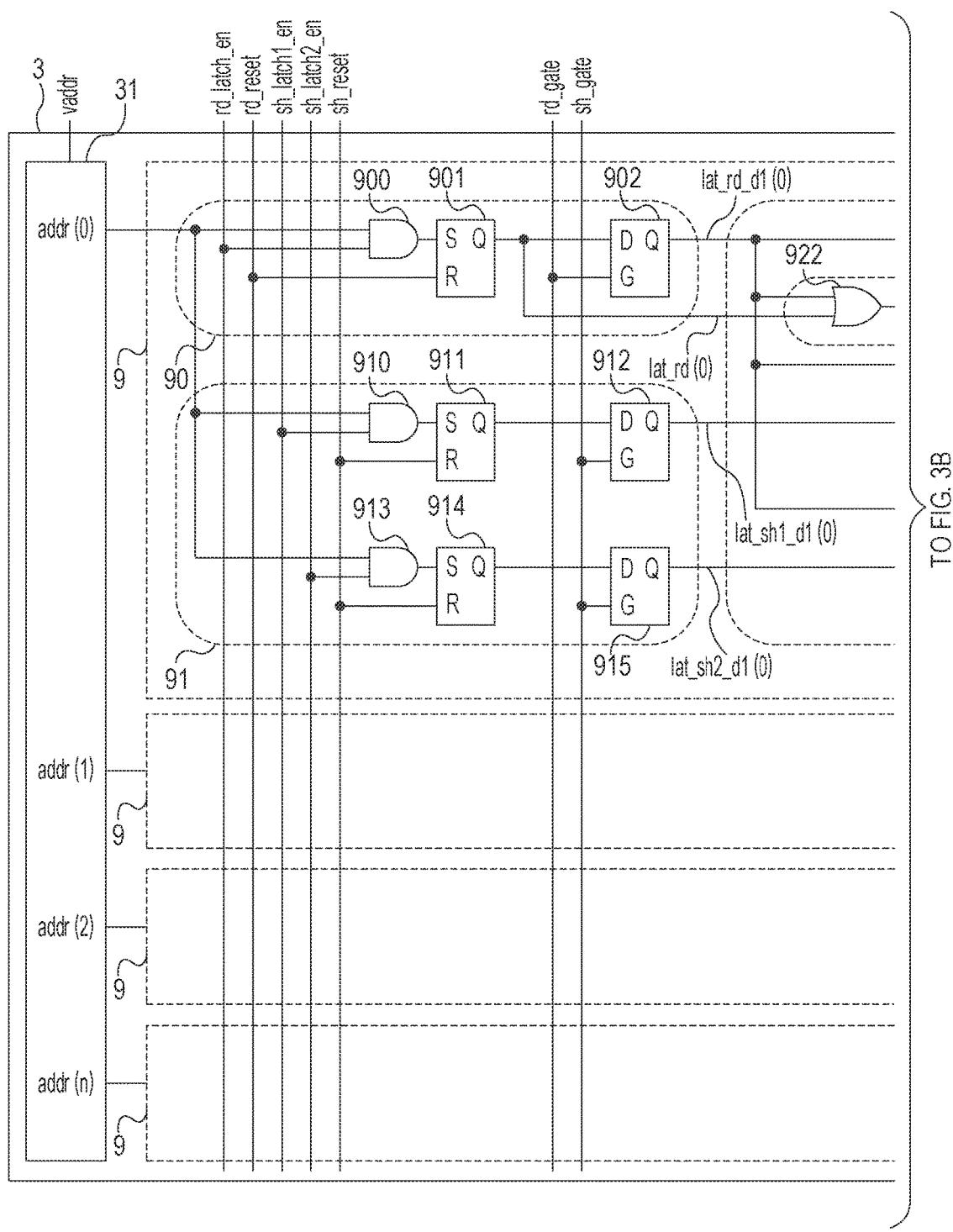
FIGS. 3A and 3B are a block diagram illustrating a vertical scanner according to a first embodiment.
Figure 3B:
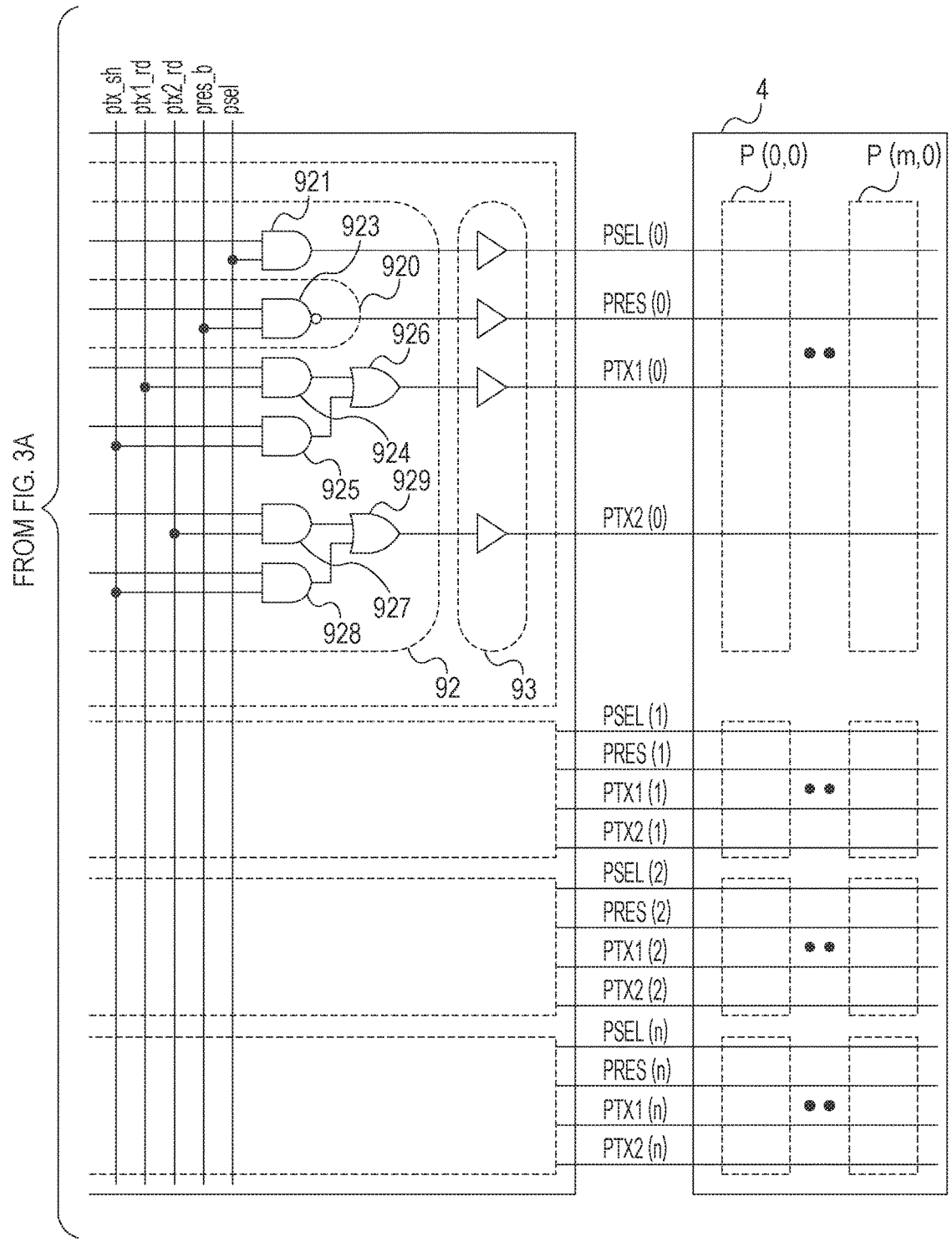

FIGS. 3A and 3B are blocks diagram illustrating the vertical scanner 3. The vertical scanner 3 includes an address decoder 31 and n+1 drivers 9. The address decoder 31 decodes an address signal vaddr generated by the controller 2 so as to generate decoded signals addr(0) to addr(n) to be output to the respective drivers 9. The address signal vaddr indicates a row number to be driven in the pixel area 4, and each of the decoded signals addr(0) to addr(n) is a selection signal used to select a corresponding one of the drivers 9 in one of the rows to be driven in the pixel area 4. Each of the decoded signals addr(0) to addr(n) is also a selection signal to deselect the drivers 9 corresponding to rows not to be driven in the pixel area 4.

Each of the drivers 9 includes a reading storage 90, an accumulation storage 91, a calculator 92, and a level shifter 93. Note that signals rd_latch_en, rd_reset, sh_latch1_en, sh_latch2_en, sh_reset, rd_gate, and sh_gate are control signals generated by the controller 2. Furthermore, signals ptx_sh, ptx1_rd, ptx2_rd, and pres_b, and psel are also control signals generated by the controller 2. These signals are used in common by the n+1 drivers 9. Although a configuration of the drivers 9 in a zeroth row is mainly described hereinafter, the drivers 9 in the other rows may have the same configuration. Although the drivers 9 in the individual rows have the same configuration, the drivers 9 in different rows may have different configurations where appropriate.

The reading storage 90 includes an AND circuit 900, an SR latch 901, and a D latch 902. The decoded signal addr(0) output from the address decoder 31 is supplied to one input terminal of the AND circuit 900. The signal rd_latch_en is supplied to the other input terminal of the AND circuit 900. Therefore, a logical product of the decoded signal addr(0) and the signal rd_latch_en is output from the AND circuit 900 and supplied to a set terminal S of the SR latch 901. Furthermore, the signal rd_reset is supplied to a reset terminal R of the SR latch 901. A signal lat_rd(0) output from an output terminal Q of the SR latch 901 is supplied to a data input terminal D of the D latch 902. A signal rd_gate is supplied to a gate input terminal G of the D latch 902. When the decoded signal addr(0) and the signal rd_latch_en are brought into a high level, the SR latch 901 stores "1". Thereafter, when the signal rd_gate is brought into a high level, the D latch 902 stores "1", and thereafter, when the signal rd_reset is brought into a high level, a storage value of the SR latch 901 returns to "0". When the signal rd_gate is brought into the high level again, a storage value of the D latch 902 returns to "0". An output signal lat_rd(0) output from the output terminal Q of the SR latch 901 and an output signal lat_rd_d1(0) output from an output terminal Q of the D latch 902 are supplied to the calculator 92. The calculator 92 generates a driving signal in accordance with states of the signal lat_rd(0) and the signal lat_rd_d1(0) so as to select a row of a target for reading signals from the pixel area 4 and read pixel signals.

The accumulation storage 91 includes AND circuits 910 and 913, SR latches 911 and 914, and D latches 912 and 915. The decoded signal addr(0) output from the address decoder 31 is supplied to one input terminal of the AND circuit 910. The signal sh_latch_en is supplied to the other input terminal of the AND circuit 910. Therefore, a logical product of the decoded signal addr(0) and the signal sh_latch1_en is output from the AND circuit 910 and supplied to a set terminal S of the SR latch 911. Furthermore, the signal sh_reset is supplied to a reset terminal R of the SR latch 911. A signal output from an output terminal Q of the SR latch 911 is supplied to a data input terminal D of the D latch 912. A signal sh_gate is supplied to a gate input terminal G of the D latch 912. When the decoded signal addr(0) and the signal sh_latch1_en are brought into a high level, the SR latch 911 stores "1". Subsequently, when the signal sh_gate is brought into a high level, the D latch 912 stores "1". Similarly, the decoded signal addr(0) output from the address decoder 31 is supplied to one input terminal of the AND circuit 913. The signal sh_latch2_en is supplied to the other input terminal of the AND circuit 913. Therefore, a logical product of the decoded signal addr(0) and the signal sh_latch2_en is output from the AND circuit 913 and supplied to a set terminal S of the SR latch 914. Furthermore, the signal sh_reset is supplied to a reset terminal R of the SR latch 914. A signal output from an output terminal Q of the SR latch 914 is supplied to a data input terminal D of the D latch 915. Furthermore, a signal sh_gate is supplied to a gate input terminal G of the D latch 915. When the decoded signal addr(0) and the signal sh_latch2_en are brought into a high level, the SR latch 914 stores "1". Thereafter, when the signal sh_gate is brought into a high level, the D latch 915 stores "1". An output signal lat_sh1_d1(0) output from the output terminal Q of the D latch 912 and an output signal lat_sh2_d1(0) output from the output terminal Q of the D latch 915 are supplied to the calculator 92. The signal lat_sh1_d1(0) resets photodiodes PD1 of pixel circuits P included in the pixel area 4, and thereafter, cancels the reset, and is used to select a row to be brought into a charge accumulation state. Similarly, the signal lat_sh2_d1(0) resets photodiodes PD2 of the pixel circuits P included in the pixel area 4, and thereafter, cancels the reset, and is used to select a row to be brought into a charge accumulation state.

The calculator 92 includes a reset signal calculator 920, AND circuits 921, 924, 925, 927, and 928, and OR circuits 926 and 929. The reset signal calculator 920 includes an OR circuit 922 and an NAND circuit 923. The signals lat_rd(0) and lat_rd_d1(0) output from the reading storage 90 and the signals lat_sh1_d1(0) and lat_sh2_d1(0) output from the accumulation storage 91 are supplied to the calculator 92. The calculator 92 is a combinational logic circuit which performs a logical operation among these input signals and signals ptx_sh, Ptx1_rd, ptx2_rd, pres_b, and psel. The level shifter 93 is disposed in a following stage of the calculator 92. The level shifter 93 performs conversion of a voltage level before outputting a signal. A signal having a voltage level converted by the level shifter 93 is supplied to the pixel area 4.

The signal lat_rd_d1(0) output from the reading storage 90 is supplied to one input terminal of the AND circuit 921. The signal psel is supplied to the other input terminal of the AND circuit 921. Accordingly, a logical product of the signals lat_rd_d1(0) and psel is output from the AND circuit 921. The output signal is supplied as a signal PSEL(0) through the level shifter 93 to the pixel area 4.

The reset signal calculator 920 is constituted by a combinational logic circuit among the signals lat_rd_d1(0), lat_rd(0), and pres_b. The signal lat_rd_d1(0) is supplied to one input terminal of the OR circuit 922. The signal lat_rd(0) is supplied to the other input terminal of the OR circuit 922. Accordingly, a logical sum of the signal lat_rd_d1(0) and the signal lat_rd(0) is output from the OR circuit 922 and supplied to one input terminal of the NAND circuit 923. The signal pres_b is supplied to the other input terminal of the AND circuit 923. A reversal value of a logical product of the signal output from the OR circuit 922 and the signal pres_b is output from the NAND circuit 923. This signal is output to the pixel area 4 as a signal PRES(0) through the level shifter 93.

The signal lat_rd_d1(0) is supplied to one input terminal of the AND circuit 924. A signal ptx1_rd is supplied to the other input terminal of the AND circuit 924, and a logical product of the signal lat_rd_d1(0) and the signal ptx1_rd is output from the AND circuit 924. The signal lat_sh1_d1(0) is supplied to one input terminal of the AND circuit 925. A signal ptx_sh is supplied to the other input terminal of the AND circuit 925, and a logical product of the signal lat_sh1_d1(0) and the signal ptx_sh is output from the AND circuit 925. An output signal of the AND circuit 924 is supplied to one input terminal of the OR circuit 926, and an output signal of the AND circuit 925 is supplied to the other input terminal of the OR circuit 926. Accordingly, a logical sum of these signals is output from the OR circuit 926. This signal is supplied as a signal PTX1(0) through the level shifter 93 to the pixel area 4.

Similarly, the signal lat_rd_d1(0) is supplied to one input terminal of the AND circuit 927. A signal ptx2_rd is supplied to the other input terminal of the AND circuit 927, and a logical product of the signal lat_rd_d1(0) and the signal ptx2_rd is output from the AND circuit 927. The signal lat_sh2_d1(0) is supplied to one input terminal of the AND circuit 928. The signal ptx_sh is supplied to the other input terminal of the AND circuit 928, and a logical product of the signal lat_sh2_d1(0) and the signal ptx_sh is output from the AND circuit 928. An output signal of the AND circuit 927 is supplied to one input terminal of the OR circuit 929, and an output signal of the AND circuit 928 is supplied to the other input terminal of the OR circuit 929. Accordingly, a logical sum of these signals is output from the OR circuit 929. This signal is output to the pixel area 4 as a signal PTX2(0) through the level shifter 93.

Figure 4A:
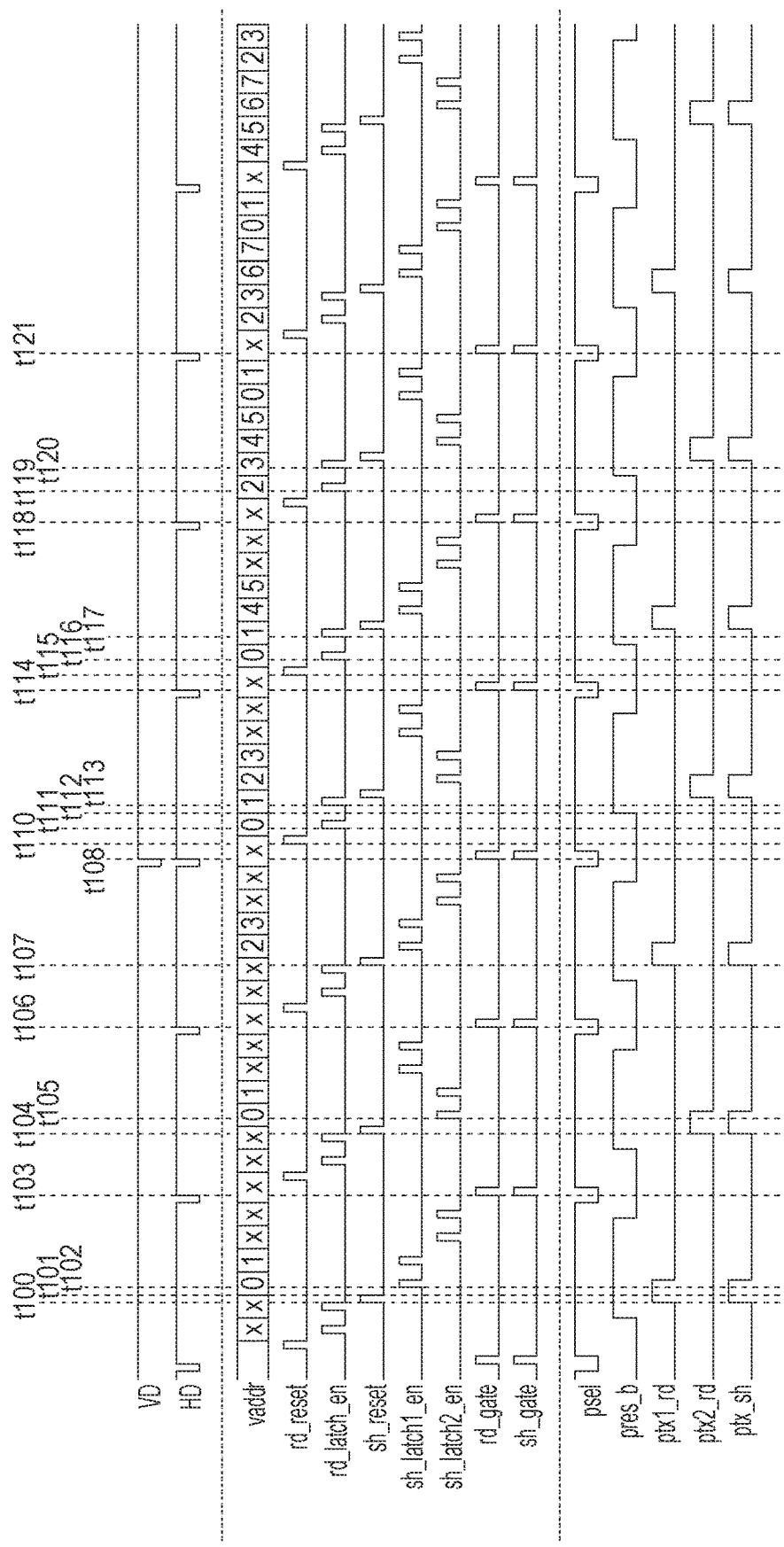
Figure 4B:
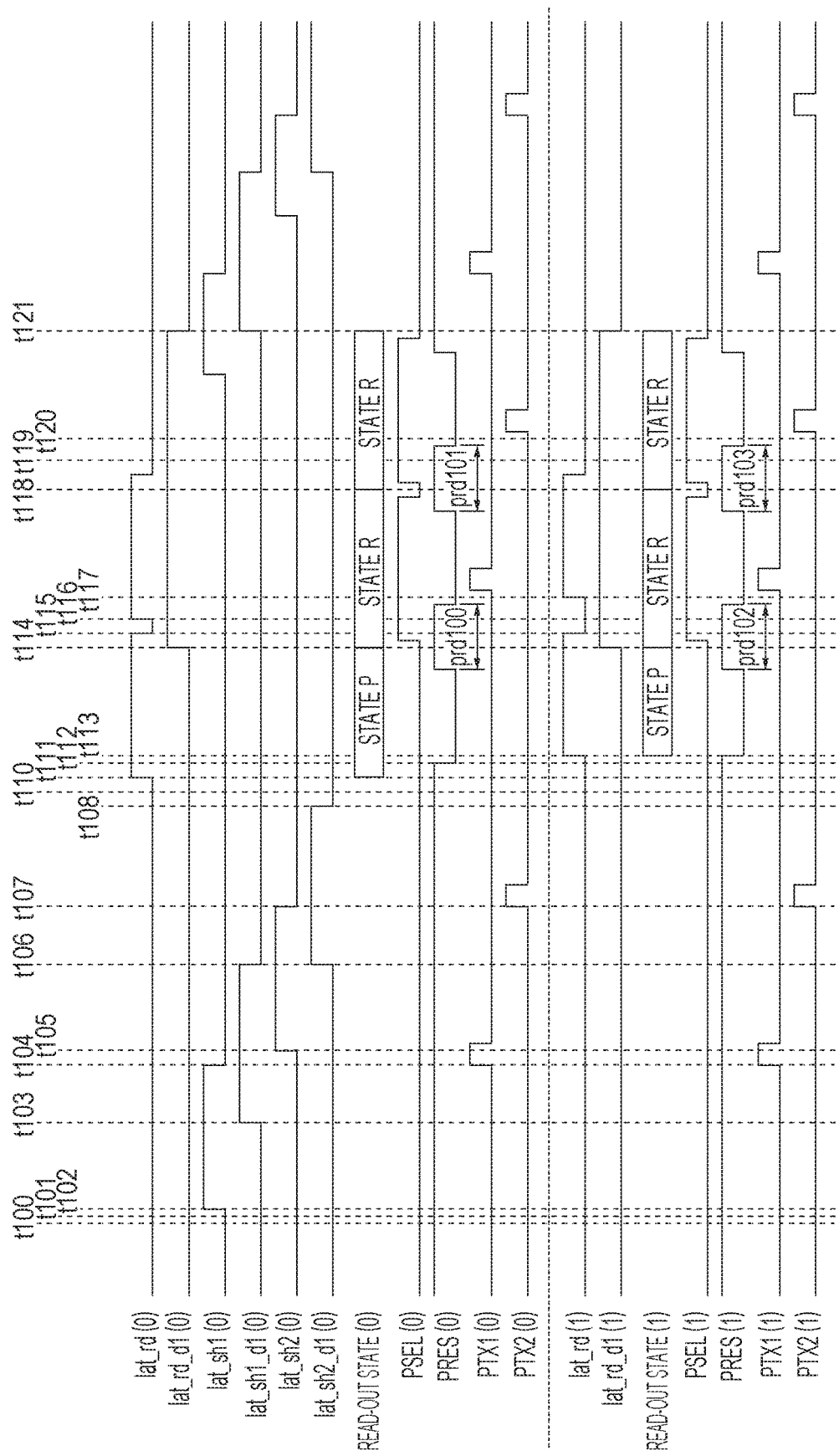

FIGS. 4A to 4C are a timing chart illustrating a method for driving the vertical scanner 3 and the pixel area 4 of this embodiment. In this driving method, electronic shutter scan and read-out scan are alternately performed every two rows, for example. Hereinafter, operations of the vertical scanner 3 and the pixel area 4 will be described with reference to FIGS. 1, 2, 3A, 3B, 4A, 4B, and 4C. Note that, in changes of signal levels illustrated in FIGS. 4A to 4C, descriptions of portions which are not important for scanning on the pixel area 4 and redundant portions may be omitted.

In a period of time from a time point t100 to a time point t108, electronic shutter scan is performed using pixel circuits P(0, 0) to P(m, 1) in zeroth and first rows of the pixel area 4. The operation in the zeroth row is focused on and described.

At the time point t100, the controller 2 brings a signal sh_reset into a high level, and thereafter, into a low level. By this, the SR latches 911 and 914 are reset.

At a time point t101, when the controller 2 changes a value of the address signal vaddr to "0", the address decoder 31 decodes the value "0" and brings the decoded signal addr(0) to a high level.

At a time point t102, the controller 2 brings the signal sh_latch1_en into a high level, and thereafter, into a low level. Here, both of the signal sh_latch1_en input to the AND circuit 910 and the decoded signal addr(0) are in the high level, and therefore, a logical product of these signals, that is, an output of the AND circuit 910 is also in a high level. This output is supplied to the set terminal S of the SR latch 911. By this, "1" is stored in the SR latch 911 and the SR latch 911 outputs a signal in a high level.

At a time point t103, the controller 2 brings the signal rd_gate and the signal sh_gate into a high level, and thereafter, into a low level. The D latch 912 latches a high level signal supplied to the data input terminal D of the D latch 912 from the SR latch 911 at a timing when the signal sh_gate supplied to the gate input terminal G of the D latch 912 is brought into a high level. As a result, the signal lat_sh1_d1(0) output from the accumulation storage 91 is brought into a high level. Here, a signal output from the OR circuit 926 corresponds to a value of the signal ptx_sh, that is, in a low level, since the signal lat_rd_d1(0) is in the low level. Accordingly, the signal PTX1(0) is in a low level.

At a time point t104, the controller 2 brings the signal ptx_sh into a high level. Here, the signal lat_rd_d1(0) is in the low level and the signal lat_sh1_d1(0) is in the high level, and therefore, the signal PTX1(0) corresponds to the value of the signal ptx_sh. Accordingly, the signal PTX1(0) is brought into a high level. Here, since the signal PRES(0) supplied to the pixel circuits P(0, 0) to P(m, 0) are in the high level, the reset transistors M3 are in a conductive state. Accordingly, potentials of the detection nodes DN are initialized in accordance with a potential of VCC. Since the signal PTX1(0) is also in the high level, the transfer transistors M1 are brought into a conductive state. By this, charge accumulated in the photodiodes PD1 is discharged and the photodiodes PD1 are reset. Thereafter, the controller 2 brings the signal ptx_sh into a low level. Since the signal PTX1(0) is brought into a low level again, the transfer transistors M1 of the pixel circuits P(0, 0) to P(0, m) are brought into a non-conductive state. By this, the reset state of the photodiodes PD1 is cancelled, and the photodiodes PD1 are brought into a charge accumulation state.

At the time point t104, the controller 2 brings the signal sh_reset into a high level, and thereafter, into a low level. By this, the SR latches 911 and 914 are reset. When the controller 2 changes the value of the address signal vaddr to "0" again, the address decoder 31 decodes the value "0" and brings the decoded signal addr(0) into a high level.

At a time point t105, the controller 2 brings the signal sh_latch2_en into a high level, and thereafter, into a low level. Here, both of the signal sh_latch2_en input to the AND circuit 913 and the decoded signal addr(0) are in the high level, and therefore, a logical product of these signals, that is, an output of the AND circuit 913 is also in a high level. This output is supplied to the set terminal S of the SR latch 914. By this, "1" is stored in the SR latch 914 and an output signal of the SR latch 914 is brought into a high level.

At a time point t106, the controller 2 brings the signals rd_gate and sh_gate into a high level, and thereafter, into a low level. The D latch 912 latches a low level signal supplied to the data input terminal D of the D latch 912 from the SR latch 911 at a timing when the signal sh_gate supplied to the gate input terminal G is brought into a high level. As a result, the signal lat_sh1_d1(0) output from the accumulation storage 91 is brought into a low level. On the other hand, the D latch 915 latches a high level signal supplied to the data input terminal D of the D latch 915 from the SR latch 914 at a timing when the signal sh_gate supplied to the gate input terminal G is brought into the high level. As a result, the signal lat_sh2_d1(0) output from the accumulation storage 91 is brought into a high level. Here, a signal output from the OR circuit 929 corresponds to a value of the signal ptx_sh, that is, in a low level, since the signal lat_rd_d1(0) is in the low level. Accordingly, the signal PTX2(0) is in a low level.

At a time point t107, the controller 2 brings the signal ptx_sh into a high level. Here, the signal lat_rd_d1(0) is in the low level and the signal lat_sh2_d1(0) is in the high level, and therefore, the signal PTX2(0) corresponds to the value of the signal ptx_sh. Accordingly, the signal PTX2(0) is brought into a high level. Here, since the signal PRES(0) supplied to the pixel circuits P(0, 0) to P(m, 0) is in the high level, the reset transistors M3 are in a conductive state. Accordingly, the potentials of the detection nodes DN are initialized in accordance with a potential of VCC. Since the signal PTX2(0) is also in the high level, the transfer transistors M2 are brought into a conductive state. By this, charge accumulated in the photodiode PD2 is discharged and the photodiode PD2 is reset. Thereafter, the controller 2 brings the signal ptx_sh into a low level. When the signal PTX2(0) is brought into a low level again, transfer transistors M2 of the pixel circuits P(0, 0) to P(0, m) are brought into a non-conductive state. By this, the reset state of the photodiode PD2 is cancelled, and the photodiode PD2 is brought into a charge accumulation state.

At a time point t108, the controller 2 brings the signals rd_gate and sh_gate into a high level, and thereafter, into a low level. The D latch 915 latches a low level signal supplied to the data input terminal D of the D latch 915 from the SR latch 914 at a timing when the signal sh_gate supplied to the gate input terminal G is brought into a high level. As a result, the signal lat_sh2_d1(0) output from the accumulation storage 91 is brought into a low level.

In this way, the electronic shutter operation performed on the pixel circuits P(0, 0) to P(m, 0) is completed. Similarly, the electronic shutter operation is performed using the pixel circuits P(0, 1) to P(m, 1) in the period of time from the time point t100 to the time point t108.

Subsequently, in a period of time from a time point t110 to a time point t121, the read-out operation is performed on the pixel circuits P(0, 0) to P(m, 0) and the pixel circuits P(0, 1) to P(m, 1).

At the time point t110, the controller 2 brings a signal rd_reset into a high level, and thereafter, into a low level. By this, the SR latch 901 is reset. Thereafter, when the controller 2 changes the value of the address signal vaddr to "0", the address decoder 31 decodes "0" and brings the decoded signal addr(0) into a high level.

At a time point t111, the controller 2 brings the signal rd_latch_en into a high level, and thereafter, into a low level. Here, both of the signal rd_latch_en input to the AND circuit 900 and the decoded signal addr(0) are in the high level, and therefore, a logical product of these signals, that is, an output of the AND circuit 900 is also in a high level. This output is supplied to the set terminal S of the SR latch 901. By this, "1" is stored in the SR latch 901 and a signal lat_rd(0) to be output from the SR latch 901 is brought into a high level. Here, the state in which the signal lat_rd_d1(0) is in a low level and the signal lat_rd(0) is in the high level is defined as a "state P" (P: Preparatory) indicating a preparatory state of a read-out state of the pixel circuits P.

At a time point t112, when the controller 2 changes the value of the address signal vaddr to "1", the address decoder 31 decodes "1" and brings a decoded signal addr(1) to a high level.

At a time point t113, the controller 2 brings the signal rd_latch_en into a high level, and thereafter, into a low level. Then the same operation is performed on the drivers 9 which receive the decoded signal addr(1) as an input, and the signal lat_rd(1) is brought into a high level. Here, the read-out state of the pixel circuits P is the "state P".

In the OR circuit 922 of the reset signal calculator 920, one input signal lat_rd(0) of the OR circuit 922 is in the high level, and therefore, a logical sum of the input signal lat_rd(0) and the other input signal lat_rd_d1(0) is in a high level. Accordingly, a signal output from the OR circuit 922 is in a high level. The NAND circuit 923 receives the signal in the high level from the OR circuit 922 which is one input signal to the NAND circuit 923. Therefore, when the signal pres_b which is the other input signal is in a low level, the NAND circuit 923 outputs a signal in a high level whereas when the signal pres_b is in a high level, the NAND circuit 923 outputs a signal in a low level. Specifically, when the signal lat_rd(0) is in the high level, the NAND circuit 923 outputs a reversal signal of the signal pres_b. Then the signal output from the NAND circuit 923 is supplied as a signal PRES(0) to the reset transistors M3 of the pixel circuits P(0, 0) to P(m, 0) through the level shifter 93. When the signal PRES(0) is brought into a low level, the reset transistors M3 are brought into a non-conductive state and detection nodes DN are brought into a floating state. Thereafter, when the signal PRES(0) is brought into a high level, the reset transistors M3 are brought into a conductive state and a potential of the detection nodes DN are initialized in accordance with a potential of VCC. Specifically, the read-out state of the pixel circuits P(0, 0) to P(m, 0) enter the "state P", and the detection nodes DN of the pixel circuits P(0, 0) to P(m, 0) are temporarily brought into a floating state, and thereafter, initialized again.

Similarly, the read-out state of the pixel circuits P(0, 1) to P(m, 1) also enter the "state P", and the detection nodes DN of the pixel circuits P(0, 1) to P(m, 1) are brought into a floating state, and thereafter, initialized again.

At a time point t114, the controller 2 brings the signal rd_gate and the signal sh_gate into a high level, and thereafter, into a low level. The D latch 902 latches a high level signal supplied to the data input terminal D of the D latch 902 from the SR latch 901 at a timing when the signal rd_gate supplied to the gate input terminal G is brought into a high level. As a result, the signal lat_rd_d1(0) output from the reading storage 90 is brought into a high level. Similarly, the signal lat_rd_d1(1) is brought into a high level. This state is maintained until the controller 2 brings the signal rd_gate into a high level, and thereafter, into a low level. Here, the state in which the signal lat_rd_d1(0) is in the high level is defined as a "state R" (R: Read-select, that is, reading out and selection) in the read-out state of the pixel circuits P.

The AND circuit 921 outputs a signal while one input signal lat_rd_d1(0) of the AND circuit 921 is in the high level. Therefore, the AND circuit 921 outputs a signal in a high level when the other input signal psel is in a high level whereas the AND circuit 921 outputs a signal in a low level when the input signal psel is in a low level. Specifically, when the signal lat_rd_d1(0) is in the high level, the AND circuit 921 outputs a value of the signal psel. Then the signal output from the AND circuit 921 is supplied as a signal PSEL(0) to the selection transistors M5 of the pixel circuits P(0, 0) to P(m, 0) through the level shifter 93. When the signal PSEL(0) is brought into a high level, the selection transistors M5 of the pixel circuits P(0, 0) to P(m, 0) are brought into a conductive state, and these pixel circuits are brought into a selection state.

Similarly, the signal PSEL(1) is also brought into a high level, the selection transistors M5 of the pixel circuits P(0, 1) to P(m, 1) are brought into a conductive state, and these pixel circuits are also brought into a selection state.

In the OR circuit 922 of the reset signal calculator 920, one input signal lat_rd_d1(0) of the OR circuit 922 is in the high level, and therefore, a signal output from the OR circuit 922 is in a high level irrespective of the other input signal. The NAND circuit 923 outputs a reversal signal of the signal pres_b since a signal output from the OR circuit 922 which is one input signals is in a high level. When the signal PRES(0) is brought into a low level, the reset transistors M3 of the pixel circuits P(0, 0) to P(m, 0) are brought into a non-conductive state and the detection nodes DN are brought into a floating state. Here, the amplification transistors M4 of the pixel circuits P(0, 0) to P(m, 0) and a constant current source, not illustrated, operate as a source follower.

Similarly, when the signal PRES(1) is brought into a low level, the reset transistors M3 of the pixel circuits P(0, 1) to P(m, 1) are brought into a non-conductive state and the detection nodes DN are brought into a floating state. Here, the amplification transistors M4 of the pixel circuits P(0, 1) to P(m, 1) and the constant current source, not illustrated, operate as a source follower. Charge accumulated in the photodiodes has not been transferred to the detection nodes DN. Therefore, noise signals (N signals) caused by the detection nodes DN and the selection transistors M4 in the pixel circuits in the zeroth row and the pixel circuits in the first row are averaged and appear in vertical output lines Vline(0) to Vline(m).

One input signal lat_rd_d1(0) of the AND circuit 924 is in a high level. Therefore, the AND circuit 924 outputs a signal in a high level when the other input signal ptx1_rd is in a high level whereas the AND circuit 924 outputs a signal in a low level when the input signal ptx1_rd is in a low level. Specifically, when the signal lat_rd_d1(0) is in a high level, the AND circuit 924 outputs a value of the signal ptx1_rd. On the other hand, since one input signal lat_sh1_d1(0) of the AND circuit 925 is in a low level, the AND circuit 925 outputs a signal in a low level irrespective of a level of the other input signal ptx_sh. An output signal of the OR circuit 926 corresponds to a logical sum of and the output signal of the AND circuit 924 and the output signal of the AND circuit 925, and therefore, the OR circuit 926 outputs a value the same as the signal output from the AND circuit 924, that is, a value of the signal ptx1_rd. Then the signal output from the OR circuit 926 is supplied as a signal PTX1 (0) to the transfer transistors M1 of the pixel circuits P(0, 0) to P(m, 0).

Since the AND circuit 927 receives one input signal lat_rd_d1(0) in the high level, the AND circuit 927 outputs a value of the signal ptx2_rd. Since the AND circuit 928 receives one input signal lat_sh2_d1(0) in the low level, the AND circuit 928 outputs a signal in a low level. An output signal of the OR circuit 929 corresponds to a logical sum of the output signal of the AND circuit 927 and the output signal of the AND circuit 928, and therefore, the OR circuit 926 outputs a value the same as the signal output from the AND circuit 927, that is, a value of the signal ptx2_rd. The signal PTX2(0) having a value the same as the value of the signal ptx2_rd is output.

When the signal PTX1(0) is brought into a high level, the transfer transistors M1 of the pixel circuits P(0, 0) to P(m, 0) are brought into a conductive state. Since the signal PTX2(0) is in a low level, only charge accumulated in the photodiodes PD1 is transferred to the detection nodes DN. When the signal PTX1(0) is brought into a low level, the transfer transistors M1 are brought into a non-conductive state so that the transfer of the charge accumulated in the photodiodes PD1 to the detection nodes DN is completed. Thereafter, the amplification transistors M4 and the constant current source, not illustrated, operate as a source follower.

Similarly, when the signal PTX1(1) is brought into a high level, the transfer transistors M1 of the pixel circuits P(0, 1) to P(m, 1) are brought into a conductive state. Since the signal PTX2(1) is in a low level, only charge accumulated in the photodiodes PD1 is transferred to the detection nodes DN. When the signal PTX1(1) is brought into a low level, the transfer transistors M1 are brought into a non-conductive state so that the transfer of the charge accumulated in the photodiodes PD1 to the detection nodes DN is completed. Thereafter, the amplification transistors M4 and the constant current source, not illustrated, operate as a source follower. Pixel signals (S signals) corresponding to the charge held by the detection nodes DN in the pixel circuits in the zeroth row and the first row are averaged and output to the vertical output lines Vline(0) to Vline(m).

Thereafter, the signal PRES(0) and the signal PRES(1) are brought into a high level, and the detection nodes DN of the pixel circuits P(0, 0) to P(m, 0) and the pixel circuits P(0, 1) to P(m, 1) are initialized. Thereafter, the signals PSEL(0) and PSEL(1) are brought into a low level, and the pixel circuits P(0, 0) to P(m, 0) and the pixel circuits P(0, 1) to P(m, 1) are brought into a deselected state. In this way, the read out of the photodiodes PD1 of the pixel circuits in the zeroth row and the first row is completed.

In parallel to the read-out operation of the pixel circuits P in the period of time from the time point t110 to the time point t121, the signal lat_rd(0) is brought into a high level again at a time point t116 and the signal lat_rd(1) is also brought into a high level again at a time point t117.

By this, when the controller 2 brings the signal rd_gate and the signal sh_gate into a high level at a time point t118, and thereafter, into a low level, the signal lat_rd_d1(0) and the signal lat_rd_d1(1) is continued to be in the high level. Then, in a period of time from the time point t118 to the time point t121, read-out states of the pixel circuits P in the zeroth row and the first row enter the "state R", and a read-out operation is performed on the photodiodes PD2 of the pixel circuits P(0, 0) to P(m, 0) and the pixel circuits P(0, 1) to P(m, 1).

Similarly, in parallel to the read-out operation of the pixel circuits P in the period of time from a time point t118 to a time point t121, the signal lat_rd(2) is brought into a high level at a time point t119 and the signal lat_rd(3) is brought into a high level at a time point t120. Specifically, while the read-out state of the pixel circuits P in the zeroth row and the first row is the "state R", the read-out state of the pixel circuits P in a second row and a third row is the "state P".

Hereinafter, the same operation is repeatedly performed until the address signal vaddr corresponds to "n", and thereafter, the read-out scan is terminated.

According to the first embodiment described above, the imaging apparatus IS includes the pixel area 4 having the plurality of pixel circuit groups including a plurality of pixel circuits P, the plurality of drivers 9, and the address decoder 31. The plurality of drivers 9 is arranged so as to correspond to the plurality of pixel circuit groups and outputs the driving signals PSEL(x), PRES(x), PTX1(x), and PTX2(x) to the corresponding pixel circuit groups. The driving signals PSEL(x), PRES(x), PTX1(x), and PTX2(x) may also be referred to as a selection signal PSEL(x), a reset signal PRES(x), a first transfer signal PTX1(x), and a second transfer signal PTX2, respectively, according to the functions thereof. The address decoder 31 inputs logical values indicating selection or deselection of the drivers 9 to the drivers 9 as decoded signals addr(x). Each of the drivers 9 includes the SR latch 901 serving as a first holding circuit which holds the logical value lat_rd(x) based on the logical value addr(x) supplied from the address decoder 31 and outputs the logical value lat_rd(x). Each of the drivers 9 includes the D latch 902 serving as a second holding circuit which holds the logical value lat_rd_d1(x) based on the logical value lat_rd(x) output from the SR latch 901 and outputs the logical value lat_rd_d1(x). Each of the drivers 9 includes the calculator 92 which receives the logical value lat_rd(x) output from the SR latch 901 and the logical value lat_rd_d1(x) output from the D latch 902 and which performs a logical operation for generating the signal PRES(x).

The imaging apparatus IS further includes the controller 2 which generates control signals to be supplied to the drivers 9. The calculator 92 receives the first control signal pres_b generated by the controller 2, the logical value lat_rd(x) output from the SR latch 901, and the logical value lat_rd_d1(x) output from the D latch 902. The calculator 92 includes the reset signal calculator 920 which performs the logical operation for generating the driving signal PRES(x). The reset signal calculator 920 includes the OR circuit 922 which outputs a logical sum of the logical value lat_rd(x) output from the SR latch 901 and the logical value lat_rd_d1(x) output from the D latch 902. The reset signal calculator 920 includes the NAND circuit 923 which outputs a reversal value of a logical product of the logical sum output from the OR circuit 922 and the control signal pres_b generated by the controller 2. Furthermore, the calculator 92 receives the control signals psel, ptx1_rd, and ptx2_rd generated by the controller 2 and the logical value output from the D latch 902 and performs a logical operation for generating the driving signals PSEL(x), PTX1(x), and PTX2(x). The calculator 92 includes the AND circuits 921, 924, and 927 which output logical products of the logical value lat_rd_d1(x) output from the D latch 902 and the control signals psel, ptx1_rd, and ptx2_rd, respectively.

According to this embodiment, the vertical scanner 3 writes the decoded value obtained by the address decoder 31 into the SR latch 901, and thereafter, writes an output value of the SR latch 901 into the D latch 902. The calculator 92 receives the output value of the SR latch 901 and an output value of the D latch 902 so as to determine a read-out state of the pixel circuits P in accordance with the output values. In this way, the calculator 92 may generate driving signals corresponding to various states. Since the decoded value of the address decoder 31 is written in the SR latch 901 in a time sharing manner, "1" may be written to the SR latches 901 in the plurality of rows. Accordingly, the plurality of rows may simultaneously enter the same read-out state of the pixel circuits P. Then the writing to the SR latch 901 and the writing to the D latch 902 are performed in parallel so that the plurality of rows may be selected in different states before being driven.

According to the first embodiment, a part of the plurality of drivers 9 output the driving signal PRES(0) for bringing the reset transistors M3 from a conductive state through a non-conducive state to a conductive state in a period of time from the time point t11 to the time point t114. Furthermore, a part of the drivers 9 output the driving signal PRES(0) for bringing the reset transistors M3 from a conductive state through a non-conductive state to a conductive state in a subsequent period of time from the time point t114 to the time point t118. Furthermore, a part of the drivers 9 output the driving signal PRES(0) for bringing the reset transistors M3 from a conductive state through a non-conductive state to a conductive state in a subsequent period of time from the time point t118 to the time point t121.

A part of the drivers 9 output the driving signal PTX1(0) for bringing the transfer transistors M1 into a conductive state while the reset transistors M3 are in a non-conductive state in the period of time from the time point t114 to the time point t118. Furthermore, a part of the drivers 9 output the driving signal PTX2(x) for bringing the transfer transistors M2 into a conductive state while the reset transistors M3 are in a non-conductive state in the period of time from the time point t118 to the time point t121.

According to this embodiment, when the read-out state of the pixel circuits P is the "state P", only the signal PRES for driving the gate of the reset transistors M3 of the pixel circuits P is driven. In this way, a period of time in which the detection nodes DN are initialized before charge of the photodiodes PD1 is transferred may become the same as a period of time in which the detection nodes DN are initialized before charge of the photodiodes PD2 is transferred. The period of time in which the detection nodes DN are initialized before signals of the photodiode PD1 are transferred corresponds to periods prd100 and prd102 in FIG. 4B, for example. The period of time in which the detection nodes DN are initialized before signals of the photodiodes PD2 are transferred corresponds to periods prd101 and prd103 in FIG. 4B, for example. By this, the initialization states of the detection nodes DN before signal transfer may match each other, and a difference between signal qualities of the photodiodes PD1 and PD2 depending on a read-out order may be reduced.

Second Embodiment

Next, an imaging apparatus according to a second embodiment of the present disclosure will be described mainly in portions different from the first embodiment. The imaging apparatus of this embodiment is different from that of the first embodiment in a configuration of a vertical scanner. Portions which are not referred to in this embodiment are the same as those of the first embodiment.

Figure 5A:
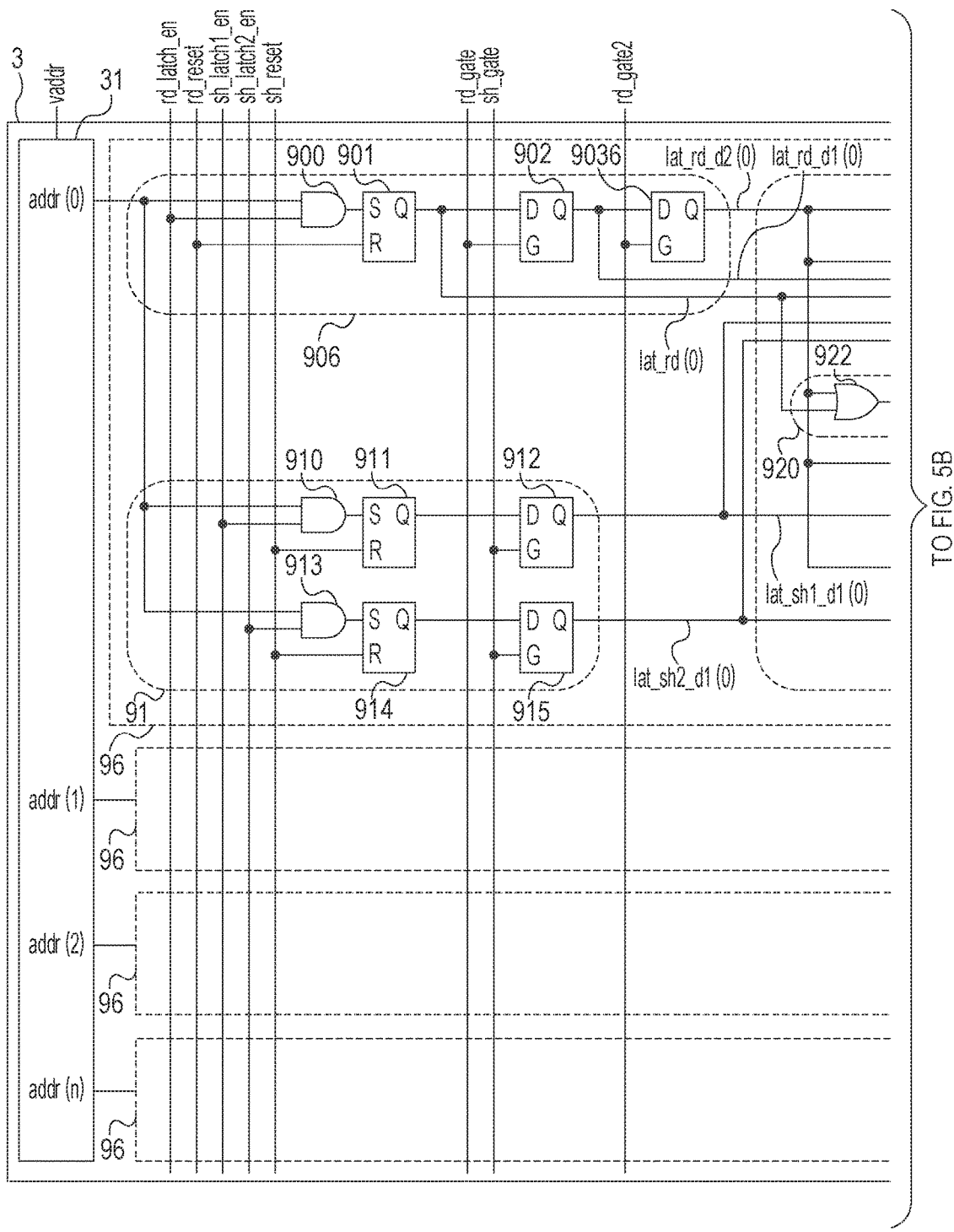
FIGS. 5A and 5B are a block diagram illustrating a vertical scanner according to a second embodiment.
Figure 5B:
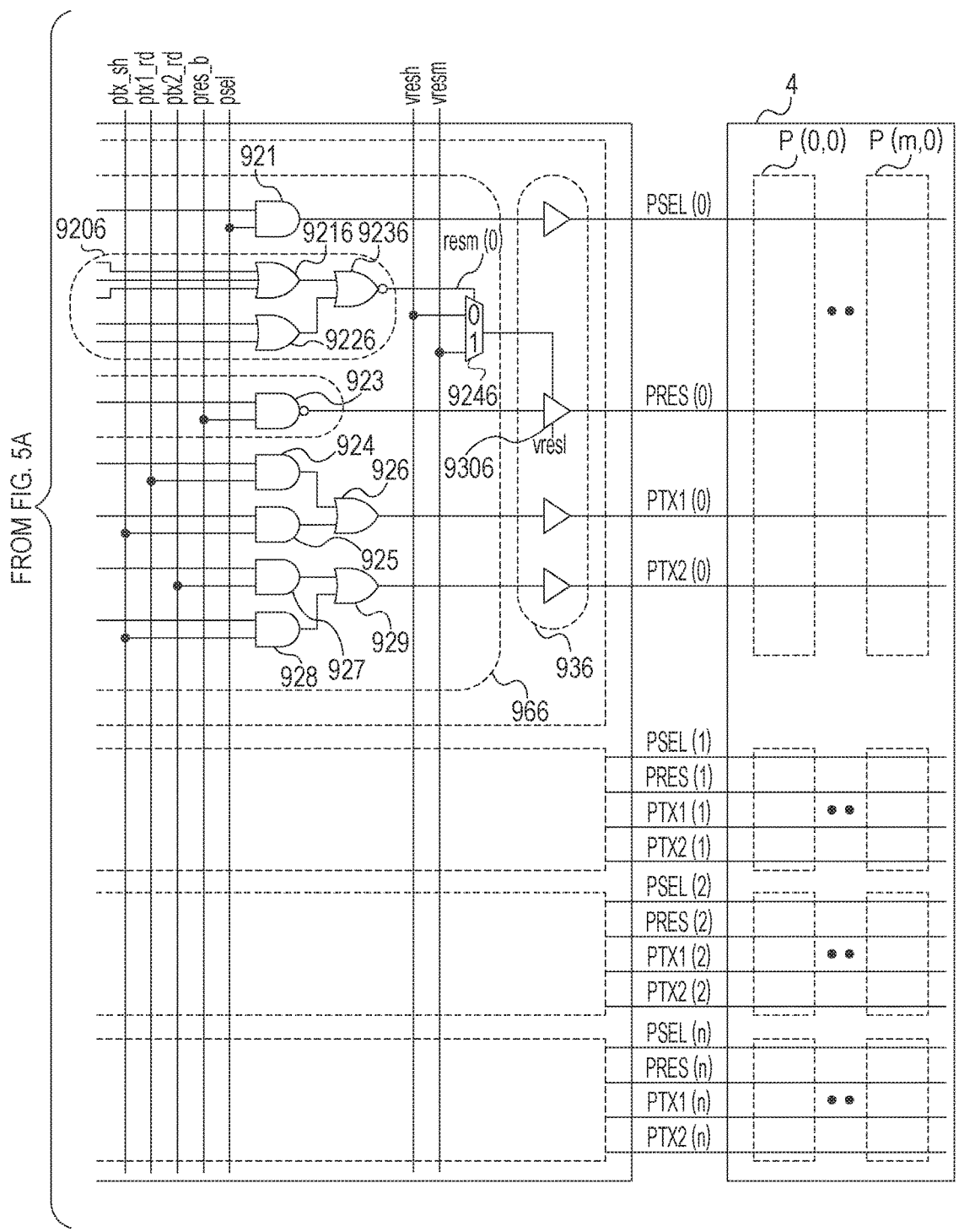

FIGS. 5A and 5B are block diagrams illustrating a vertical scanner 3 according to this embodiment. The vertical scanner 3 of this embodiment is different from the vertical scanner 3 of the first embodiment in configurations of a reading storage 906, a calculator 966, and a level shifter 936. A controller 2 of this embodiment outputs a signal rd_gate2 in addition to the signals output from the controller 2 of the first embodiment. Furthermore, a power supply line vresm is added as a power supply line corresponding to an output level of a level shift circuit 9306 which outputs an output signal PRES(0) of the level shifter 936. In FIG. 5B, power supply lines vresh and vresl corresponding to the output level of the level shift circuit 9306 are also illustrated.

The reading storage 906 includes an AND circuit 900, an SR latch 901, and D latches 902 and 9036. The connection relationship among the AND circuit 900, the SR latch 901, and the D latch 902 is substantially the same as that of the reading storage 90 of the first embodiment, and therefore, a description thereof is omitted. A signal lat_rd_d1(0) output from an output terminal Q of the D latch 902 is supplied to a data terminal D of the D latch 9036. A signal rd_gate2 is supplied to a gate input terminal G of the D latch 9036. When a decoded signal addr(0) and a signal rd_latch_en are brought into a high level, the SR latch 901 stores "1". Thereafter, when a signal rd_gate is brought into a high level, the D latch 902 stores "1", and when a signal rd_reset is brought into a high level, the storage value of the SR latch 901 returns to "0". Thereafter, when the signal rd_gate2 is brought into a high level, the D latch 9036 stores "1" which is the output signal Q of the D latch 902, and when the signal rd_gate is brought into a high level again, a storage value of the D latch 902 also returns to "0". When the signal rd_gate2 is brought into the high level again, the storage value of the D latch 9036 also returns to "0". An output signal lat_rd(0) output from an output terminal Q of the SR latch 901, an output signal lat_rd_d1(0) output from the output terminal Q of the D latch 902, and an output signal lat_rd_d2(0) output from an output terminal Q of the D latch 9036 are supplied to the calculator 966. The calculator 966 generates a driving signal corresponding to states of the signal lat_rd(0), the signal lat_rd_d1(0), and the signal lat_rd_d2(0) so as to select a row of a target for reading signals in a pixel area 4 and read pixel signals. Note that, although D latches in two stages are connected to an output of the SR latch 901 in series in this embodiment, the number of stages is not limited to 2, and a plurality of stages more than 2 may be provided.

An accumulation storage 91 of this embodiment is the same as the accumulation storage 91 of the first embodiment, and therefore, a description thereof is omitted.

The calculator 966 includes a reset signal calculator 920, AND circuits 921, 924, 925, 927, and 928, OR circuits 926 and 929, a reset level calculator 9206, and a voltage selection circuit 9246. The reset signal calculator 920 includes an OR circuit 922 and an NAND circuit 923. The reset level calculator 9206 includes a three-input OR circuit 9216, an OR circuit 9226, and a NOR circuit 9236. The calculator 966 receives the signal lat_rd(0), the signal lat_rd_d1(0), and the signal lat_rd_d2(0) supplied from the reading storage 906. Furthermore, the calculator 966 receives a signal lat_sh1_d1 (0) and a signal lat_sh2_d1(0) supplied from the accumulation storage 91. The calculator 966 is a combinational logic circuit which performs a logical operation among these input signals and signals ptx_sh, ptx1_rd, ptx2_rd, pres_b, and psel. The level shifter 936 is disposed in a following stage of the calculator 966. The level shifter 936 performs conversion of a voltage level before output. The level shifter 936 is different from the level shifter 93 of the first embodiment in that a high-level power supply voltage for the level shift circuit 9306 which outputs a signal PRES(0) is supplied from the calculator 966. A signal having a voltage level converted by the level shifter 936 is supplied to the pixel area 4.

A configuration of a circuit which generates output signals PSEL(0), PTX1(0), and PTX2(0) included in the calculator 966 is the same as that included in the calculator 92 of the first embodiment, and therefore, a description thereof is omitted.

The reset signal calculator 920 is also the same as that of the first embodiment, and therefore, a description thereof is omitted.

The reset level calculator 9206 is constituted by a combined circuit of the signals lat_rd_d2(0), lat_rd_d1(0), lat_rd (0), lat_sh1_d1(0), and lat_sh2_d1(0). The signals lat_rd_d2 (0), lat_rd_d1(0), and lat_rd(0) are supplied to different input terminals of the three-input OR circuit 9216. Therefore, a logical sum of the signals lat_rd_d2(0), lat_rd_d1(0), and lat_rd(0) is output from the OR circuit 9216 and supplied to one input terminal of the NOR circuit 9236. The signals lat_sh1_d1(0) and lat_sh2_d1(0) are supplied to different input terminals of the OR circuit 9226. Accordingly, a logical sum of the signal lat_sh1_d1(0) and the signal lat_sh2_d1(0) is output from the OR circuit 9226 and supplied to the other input terminal of the NAND circuit 9236. A reversal value of a logical sum of the output signal of the three-input OR circuit 9216 and the output signal of the OR circuit 9226 is output as a signal resm from the NOR circuit 9236. The signal resm is input to a selection signal input terminal of the voltage selection circuit 9246. The power supply lines vresh and vresm are input to different input voltage terminals of the voltage selection circuit 9246. The voltage selection circuit 9246 outputs a voltage of the power supply line vresh when the signal resm is in a low level and outputs a voltage of the power supply line vresm when the signal resm is in a high level. An output of the voltage selection circuit 9246 is input to a high-level power supply terminal of the level shift circuit 9306. By this, the signal PRES(0) may output three levels of voltages vresh, vresm, and vresl.

Figure 6A:
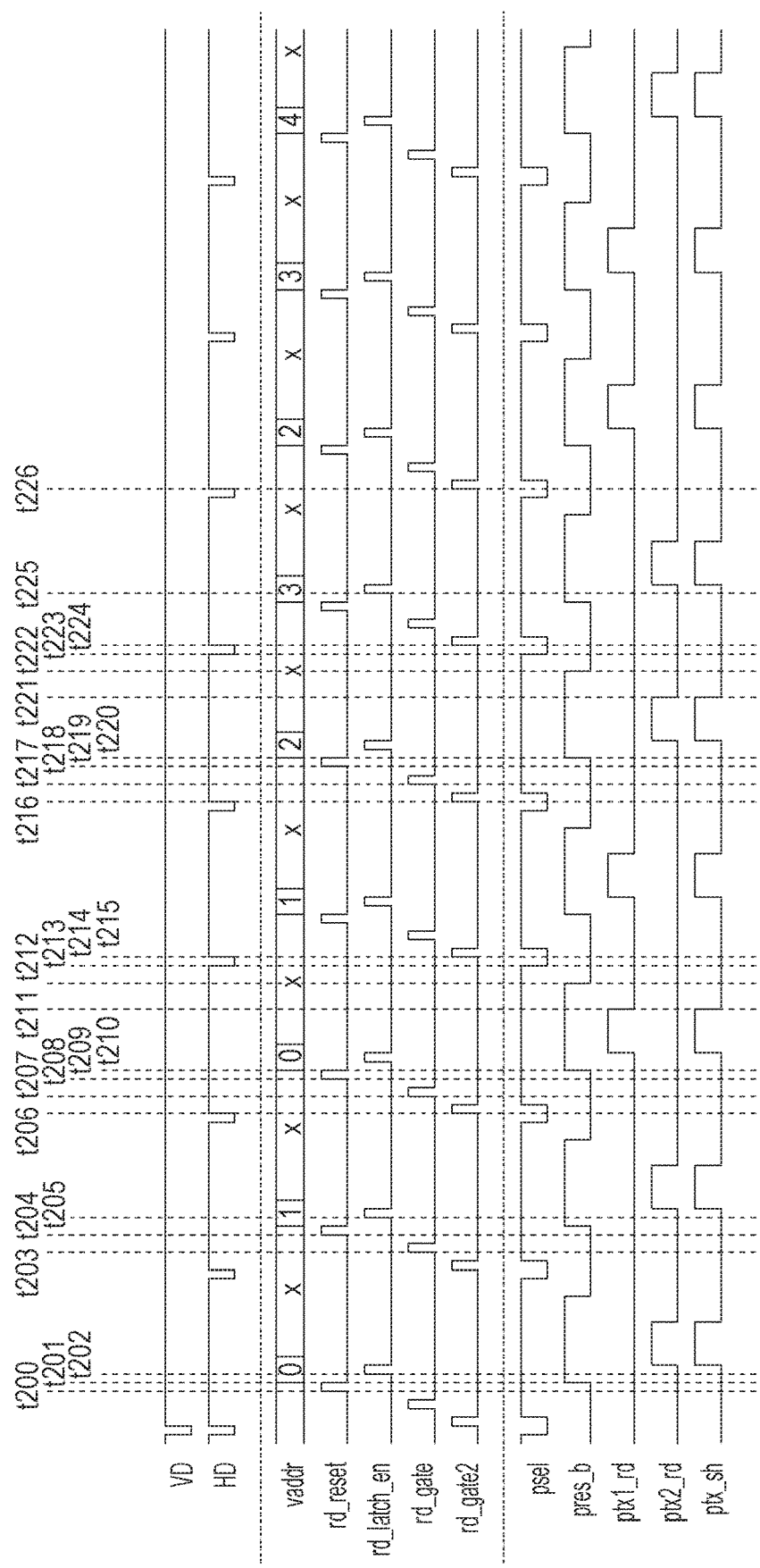
Figure 6C:
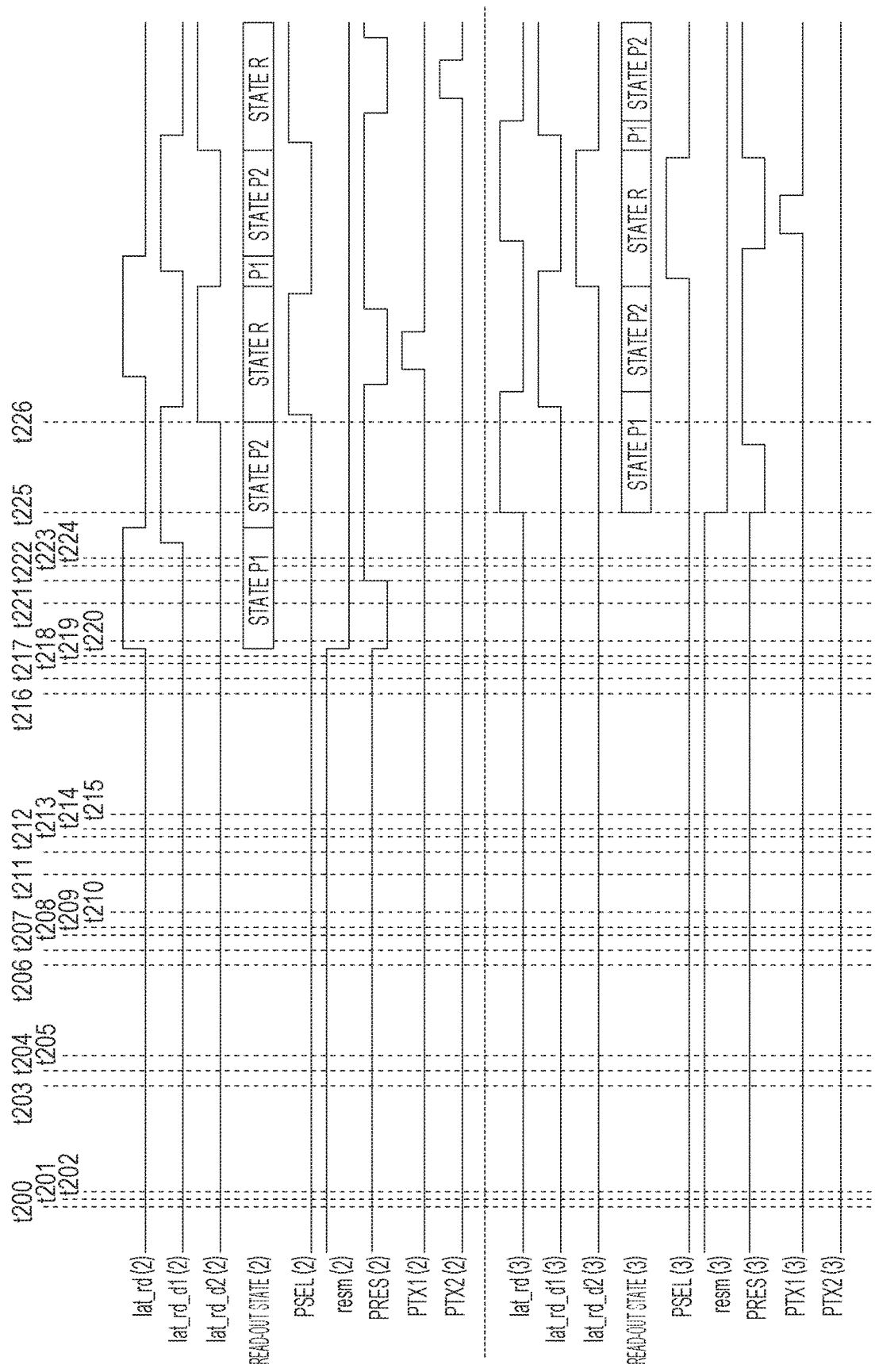

FIGS. 6A to 6C are timing charts illustrating a method for driving the vertical scanner 3 and the pixel area 4 of this embodiment. In this driving method, a case where read-out scan is successively performed on a row-by-row basis will be described. Electronic shutter scan is the same as that of the first embodiment, and therefore, descriptions of signals associated with the electronic shutter scan are omitted in FIGS. 6A to 6C. Hereinafter, operations of the vertical scanner 3 and the pixel area 4 will be described with reference to FIGS. 1, 2, 5A, 5B, 6A, 6B, and 6C. Note that, in change of signal levels illustrated in FIGS. 6A to 6C, descriptions of portions which are not important for scanning performed on the pixel area 4 and redundant portions may be omitted.

In a period of time from a time point t200 to a time point t224, a read-out operation is performed on pixel circuits P(0, 0) to P(m, 0).

At the time point t200, the controller 2 brings a signal rd_reset into a high level, and thereafter, into a low level. By this, the SR latch 901 is reset.

At a time point t201, when the controller 2 assigns "0" to an address signal vaddr, the address decoder 31 decodes "0" and brings a decoded signal addr(0) to a high level.

At a time point t202, the controller 2 brings the signal rd_latch_en into a high level, and thereafter, into a low level. Here, both of the signal rd_latch_en input to the AND circuit 900 and the decoded signal addr(0) are in a high level, and therefore, a logical product of these signals, that is, an output of the AND circuit 900 is also in a high level. This output is supplied to the set terminal S of the SR latch 901. By this, "1" is stored in the SR latch 901 and a signal lat_rd(0) output from the SR latch 901 is brought into a high level. Here, the state in which a signal lat_rd_d2(0) is in a low level and the signal lat_rd(0) is in a high level is defined as a "state P1" as a read-out state of the pixel circuits P.

In the OR circuit 922 of the reset signal calculator 920, the signal lat_rd(0) which is one input signal of the OR circuit 922 is in the high level, and therefore, a logical sum of the input signal lat_rd(0) and the other input signal lat_rd_d2(0) is in a high level. Accordingly, a signal output from the OR circuit 922 is in a high level. The NAND circuit 923 outputs a signal in a low level since a signal output from the OR circuit 922 which is one input signal of the NAND circuit 923 is in a high level and the signal pres_b which is the other input signal is in a high level. Thereafter, the signal PRES(0) is converted into the voltage vresl by the level shift circuit 9306 and the signal PRES(0) is supplied to the reset transistors M3 of the pixel circuits P(0, 0) to P(m, 0). When the signal PRES(0) is converted into the voltage vresl, the reset transistors M3 are brought into a non-conductive state and the detection nodes DN are brought into a floating state.

Furthermore, the three-input OR circuit 9216 of the reset level calculator 9206 outputs a signal in a high level since the signal lat_rd(0) which is one input signal is in a high level. Since the signal output from the three-input OR circuit 9216 which is one input signal of the NOR circuit 9236 is in the high level, the NOR circuit 9236 outputs a signal resm(0) in a low level. Since the signal resm(0) input to the selection signal input terminal of the voltage selection circuit 9246 is in the low level, the voltage selection circuit 9246 outputs a voltage vresh.

Thereafter, the signal pres_b is brought into a low level and the NAND circuit 923 outputs a signal in a high level. Since the voltage selection circuit 9246 outputs the voltage vresh, the signal PRES(0) is changed to the voltage vresh. Then the reset transistors M3 are brought into a conductive state and potentials of the detection nodes DN are initialized in accordance with a potential of VCC. In this way, the detection nodes DN of the pixel circuits P(0, 0) to P(m, 0) are initialized.

At the time point t203, the controller 2 brings the signal rd_gate into a high level, and thereafter, into a low level. The D latch 902 latches a high level signal supplied to the data input terminal D of the D latch 902 from the SR latch 901 at a timing when the signal rd_gate supplied to a gate input terminal G is brought into a high level. As a result, the signal lat_rd_d1(0) output from the reading storage 906 is brought into a high level.

At the time point t204, the controller 2 brings a signal rd_reset into a high level, and thereafter, into a low level. This signal is supplied to a reset terminal R of the SR latch 901. By this, the SR latch 901 is reset to "0" and the signal lat_rd(0) output from the SR latch 901 is brought into a low level. Here, the state in which the signal lat_rd_d2(0) is in a low level and the signal lat_rd(0) is in a low level is defined as a "state P2" of a read-out state of the pixel circuits P.

In the "state P2", the signal lat_rd_d1(0) is in a high level. Furthermore, the three-input OR circuit 9216 of the reset level calculator 9206 outputs a signal in a high level since the signal lat_rd_d1(0) which is one input signal is in a high level. Since the signal output from the three-input OR circuit 9216 which is one input signal of the NOR circuit 9236 is in the high level, the NOR circuit 9236 outputs a signal resm(0) in a low level. Since the signal resm(0) input to the selection signal input terminal of the voltage selection circuit 9246 is in the low level, the voltage selection circuit 9246 outputs a voltage vresh. The OR circuit 922 of the reset signal calculator 920 outputs a signal in a low level since the input signals lat_rd(0) and lat_rd_d2(0) are in a low level. The NAND circuit 923 receives the signal in the low level from the OR circuit 922 which is one input signal of the NAND circuit 923, and therefore, outputs a signal in a high level. Specifically, when the read-out state of the pixel circuits P is the "state P2", the signal PRES(0) continuously outputs the voltage vresh. The reset transistors M3 of the pixel circuits P(0, 0) to P(m, 0) maintain a conductive state, and the detection nodes DN maintain an initial state corresponding to a potential of the VCC.

At a time point t206, the controller 2 brings the signal rd_gate2 into a high level, and thereafter, into a low level. The D latch 9036 latches a high level signal supplied to an data input terminal D of the D latch 9036 from the SR latch 902 at a timing when the signal rd_gate2 supplied to the gate input terminal G is brought into a high level. As a result, the signal lat_rd_d2(0) output from the reading storage 906 is brought into a high level. Here, the state in which the signal lat_rd_d2(0) is in a high level is defined as a "state R" in the read-out state of the pixel circuits P.

The signal lat_rd_d2(0) which is one input signal of the AND circuit 921 is in a high level, therefore, the AND circuit 921 outputs a signal as follows. That is, the AND circuit 921 outputs a signal in a high level when the other input signal psel is in a high level whereas the AND circuit 921 outputs a signal in a low level when the other input signal psel is in a low level. Specifically, when the signal lat_rd_d2(0) is in a high level, the AND circuit 921 outputs a value of the signal psel. Then the signal output from the AND circuit 921 is supplied as a signal PSEL(0) to the selection transistors M5 of the pixel circuits P(0, 0) to P(m, 0) through the level shifter 936. When the signal PSEL(0) is brought into a high level, the selection transistors M5 of the pixel circuits P(0, 0) to P(m, 0) are brought into a conductive state, and the pixel circuits P are brought into a selection state.

At a time point t207, the controller 2 brings the signal rd_gate into a high level, and thereafter, into a low level. The D latch 902 latches a low level signal supplied to the data input terminal D of the D latch 902 from the SR latch 901 at a timing when the signal rd_gate supplied to the gate input terminal G is brought into a high level. As a result, the signal lat_rd_d1(0) output from the reading storage 906 is brought into a low level.

At a time point t209, since the signal lat_rd_d2(0) which is one input signal of the OR circuit 922 of the reset signal calculator 920 is in the high level, the OR circuit 922 outputs a signal in a high level irrespective of the other input signal. The NAND circuit 923 outputs a reversal signal of the signal pres_b since the signal output from the OR circuit 922 which is one input signal is in the high level. When the signal PRES(0) is converted into the voltage vresl, the reset transistors M3 of the pixel circuits P(0, 0) to P(m, 0) are brought into a non-conductive state and the detection nodes DN are brought into a floating state. Here, the amplification transistors M4 of the pixel circuits P(0, 0) to P(m, 0) and a constant current source, not illustrated, operate as a source follower. Since the charge accumulated in the photodiodes has not been transferred to the detection nodes DN, noise signals (N signals) caused by the detection nodes DN and the amplification transistors M4 in the pixel circuits P in the zeroth rows are supplied to vertical output lines Vline(0) to Vline(m).

At a time point t210, the signal lat_rd_d2(0) which is one input signal supplied to the AND circuit 924 is in a high level. Therefore, the AND circuit 924 outputs a signal in a high level when the signal ptx1_rd which is the other input signal is in a high level and outputs a signal in a low level when the input signal ptx1_rd is in a low level. Specifically, when the signal lat_rd_d2(0) is in a high level, the AND circuit 924 outputs a value of the signal ptx1_rd. On the other hand, since the signal lat_sh1_d1(0) which is one input signal supplied to the AND circuit 925 is in a low level, the AND circuit 925 outputs a signal in a low level irrespective of a level of the other input signal ptx_sh. An output signal of the OR circuit 926 corresponds to a logical sum of the output signal of the AND circuit 924 and the output signal of the AND circuit 925, and therefore, the OR circuit 926 outputs a value the same as the signal output from the AND circuit 924, that is, a value of the signal ptx1_rd. Then the signal output from the OR circuit 926 is supplied as a signal PTX1(0) to the transfer transistors M1 of the pixel circuits P(0, 0) to P(m, 0) through the level shifter 936.

Since the AND circuit 927 receives the signal lat_rd_d2(0) which is one input signal in the high level, the AND circuit 927 outputs a value of the signal ptx2_rd. Since the AND circuit 928 receives the signal lat_sh2_d1(0) which is one input signal in the low level, the AND circuit 928 outputs a signal in a low level. An output signal of the OR circuit 929 corresponds to a logical sum of the output signal of the AND circuit 927 and the output signal of the AND circuit 928, and therefore, the OR circuit 926 outputs a value the same as the signal output from the AND circuit 927, that is, a value of the signal ptx2_rd. The signal PTX2(0) having a value the same as the value of the signal ptx2_rd is output.

When the signal PTX1(0) is brought into a high level, the transfer transistors M1 of the pixel circuits P(0, 0) to P(m, 0) are brought into a conductive state. Since the signal PTX2(0) is in a low level, only charge accumulated in the photodiodes PD1 is transferred to the detection nodes DN.

At a time point t211, when the signal PTX1(0) is brought into a low level, the transfer transistors M1 are brought into a non-conductive state so that the transfer of the charge accumulated in the photodiodes PD1 to the detection nodes DN is completed. Thereafter, the amplification transistors M4 and the constant current source, not illustrated, operate as a source follower. Pixel signals (S signals) corresponding to the charge held by the detection nodes DN in the pixel circuits P in the zeroth row are output to the vertical output lines Vline(0) to Vline(m).

At a time point t212, the signal PRES(0) is changed to the voltage vresh and the detection nodes DN in the pixel circuits P(0, 0) to P(m, 0) are initialized.

At a time point t213, the signal PSEL(0) is brought into a low level and the pixel circuits P(0, 0) to P(m, 0) are brought into a deselected state. In this way, the read out of the photodiodes PD1 of the pixel circuits P in the zeroth row is completed.

On the other hand, at the time point t209, when the controller 2 assigns "0" to the address signal vaddr, the address decoder 31 decodes "0" and brings the decoded signal addr(0) into a high level. Thereafter, when the controller 2 brings the signal rd_latch_en into a high level, and thereafter, into a low level, the SR latch 901 stores "1" and the SR latch 901 outputs the signal lat_rd(0) in a high level.

At a time point t214, the controller 2 brings the signal rd_gate2 into a high level, and thereafter, into a low level. The D latch 9036 latches a low level signal supplied to the data input terminal D of the D latch 9036 from the D latch 902 at a timing when the signal rd_gate2 supplied to the gate input terminal G is brought into a high level. As a result, the signal lat_rd_d2(0) output from the reading storage 906 is brought into a low level, and the "state R" of the read-out state of the pixel circuits P is terminated. Since the signal lat_rd(0) is in the high level, the read-out state of the pixel circuits P is the "state P1".

At a time point t215, the controller 2 brings the signal rd_gate into a high level, and thereafter, into a low level. Then the controller 2 latches a signal in a high level supplied to the data input terminal D of the D latch 902 from the SR latch 901. As a result, the signal lat_rd_d1(0) output from the reading storage 906 is brought into a high level. Thereafter, the controller 2 brings the signal rd_reset into a high level, and thereafter, into a low level. By this, the SR latch 901 is reset to "0" and a signal lat_rd(0) output from the SR latch 901 is brought into a low level. Here, the signal lat_rd_d2(0) is in the low level, the signal lat_rd(0) is in the low level, and the read-out state of the pixel circuits P is shifted to the "state P2".

During the "state P1" and the "state P2", the signal PRES(0) maintains the voltage vresh, the reset transistors M3 of the pixel circuits P(0, 0) to P(m, 0) maintain a conductive state, and the detection nodes DN maintain an initial state corresponding to a potential of VCC.

At a time point t216, the controller 2 brings the signal rd_gate2 into a high level, and thereafter, into a low level. Consequently, the signal lat_rd_d2(0) output from the reading storage 906 is brought into a high level. Then the read-out state of the pixel circuits P becomes the "state R"

again. Then, as with the period of time from the time point t206 to the time point t214, a read-out operation is performed on the pixel circuits P(0, 0) to P(m, 0).

When the signal PSEL(0) is brought into a high level, the selection transistors M5 of the pixel circuits P(0, 0) to P(m, 0) are brought into a conductive state, and these pixel circuits P are brought into a selection state.

At a time point t219, when the signal PRES(0) is changed to the voltage vresl, the reset transistors M3 of the pixel circuits P(0, 0) to P(m, 0) are brought into a non-conductive state and the detection nodes DN are brought into a floating state. Here, the amplification transistors M4 and the constant current source, not illustrated, operate as a source follower. Therefore, noise signals (N signals) caused by the detection nodes DN and the amplification transistors M4 in the pixel circuits P in the zeroth row are supplied to the vertical output lines Vline(0) to Vline(m).

At a time point t220, the controller 2 maintains the signal ptx1_rd into the low level and brings the signal ptx2_rd into a high level. When the signal PTX1(0) is maintained in the low level, the transfer transistors M1 of the pixel circuits P(0, 0) to P(m, 0) are maintained in the non-conductive state. On the other hand, the signal PTX2(0) is brought into a high level and the transfer transistors M2 of the pixel circuits P(0, 0) to P(m, 0) are brought into a conductive state. Then only charge accumulated in the photodiodes PD2 is transferred to the detection nodes DN.

At a time point 221, when the signal PTX2(0) is brought into a low level, the transfer transistors M1 are brought into a non-conductive state so that the transfer of the charge accumulated in the photodiodes PD2 to the detection nodes DN is completed. Thereafter, the amplification transistors M4 and the constant current source, not illustrated, operate as a source follower. Pixel signals (S signals) corresponding to the charge held by the detection nodes DN in the pixel circuits P in the zeroth row are output to the vertical output lines Vline(0) to Vline(m).

At a time point t222, the signal PRES(0) is changed to the voltage vresh and the detection nodes DN in the pixel circuits P(0, 0) to P(m, 0) are initialized.

At a time point t223, the signal PSEL(0) is brought into a low level and the pixel circuits P(0, 0) to P(m, 0) are brought into a deselected state. In this way, the read out of the photodiodes PD2 of the pixel circuits P in the zeroth row is completed.

At a time point t224, the controller 2 brings the signal rd_gate2 into a high level, and thereafter, into a low level. Accordingly, the signal lat_rd_d2(0) output from the reading storage 906 is brought into a low level. Then the "state R" which is the read-out state of the pixel circuits P is terminated. The three-input OR circuit 9216 of the reset level calculator 9206 outputs a signal in a low level since all signals input to the OR circuit 9216 are in a low level. The signals lat_sh1_d1(0) and lat_sh2_d1(0), not illustrated in FIGS. 6A to 6C, which are input to the OR circuit 9226 are in a low level, and therefore, the OR circuit 9226 outputs a signal in a low level. Since both of the signals input to the NOR circuit 9236 are in a low level, the signal resm(0) is in a high level. Since the signal resm(0) input to the selection signal input terminal of the voltage selection circuit 9246 is in the high level, the voltage selection circuit 9246 outputs a voltage vresm.

In this way, the read-out operation performed on the pixel circuits P(0, 0) to P(m, 0) is terminated.

Similarly, in a period of time from a time point t205 to a time point t226, a read-out operation is performed on pixel circuits P(0, 1) to P(m, 1).

Furthermore, the read-out operation is performed on pixel circuits P(0, 2) to P(m, 2) after the time point t219, and on pixel circuits P(0, 3) to P(m, 3) after a time point t225.

Hereinafter, the same operation is repeatedly performed until the address signal vaddr corresponds to "n", and then, the read-out scan is terminated.

The second holding circuit included in the imaging apparatus IS of the second embodiment includes the plurality of D latches 902 and 9036 which are connected to the input terminal of the second holding circuit and the output terminal of the second holding terminal in series instead of the D latch 902 used as the second holding circuit in the first embodiment.

According to this embodiment, the vertical scanner 3 writes the decoded value obtained by the address decoder 31 into the SR latch 901, and thereafter, writes an output value of the SR latch 901 into the D latch 902. Thereafter, the vertical scanner 3 further writes the value output from the D latch 902 into the D latch 9036. "1" which indicates selection of a row is successively written to a latch in a following stage and an output from the latch is used so that a state of selection of a plurality of rows may be represented, and more complicated driving of pixel circuits may be enabled. Furthermore, a state is represented by an output of a latch, and therefore, driving operations in different states may be simultaneously performed in a plurality of rows such that the driving in the state R is performed in the zeroth row, the driving in the state P2 is performed in the first row, and the driving in the state P1 is performed in the second row in the period of time from the time point t216 to the time point t224.

Furthermore, according to this embodiment, when the read-out state of the pixel circuits P is the "state P1", only the signal PRES for driving the gate of the reset transistors M3 of the pixel circuits P is driven. Then a period of time in which the detection nodes DN are initialized before charge of the photodiodes PD1 is transferred may be equal to a period of time in which the detection nodes DN are initialized before charge of the photodiodes PD2 is transferred. The period of time in which the detection nodes DN are initialized before charge of the photodiodes PD1 is transferred corresponds to a period prd200 in FIG. 6B, for example. The period of time in which the detection nodes DN are initialized before charge of the photodiodes PD2 is transferred corresponds to a period prd201 in FIG. 6B, for example. Furthermore, the "state P2" is set in the zeroth row and the "state R" is set in the "state R" so that the detection nodes DN are initialized in a certain row while signals of the detection nodes DN are read in another row. By this, a period of time in which pixel signals are read may be reduced.

Third Embodiment

Next, an imaging apparatus according to a third embodiment of the present disclosure will be described mainly in portions different from the first embodiment. The imaging apparatus of this embodiment is different from that of the first embodiment in a configuration of a vertical scanner. Portions which are not referred to in this embodiment are the same as those of the first embodiment. Although a modification of the first embodiment is described as an example in this embodiment, the same modification may be made to the second embodiment.

Figure 7A:
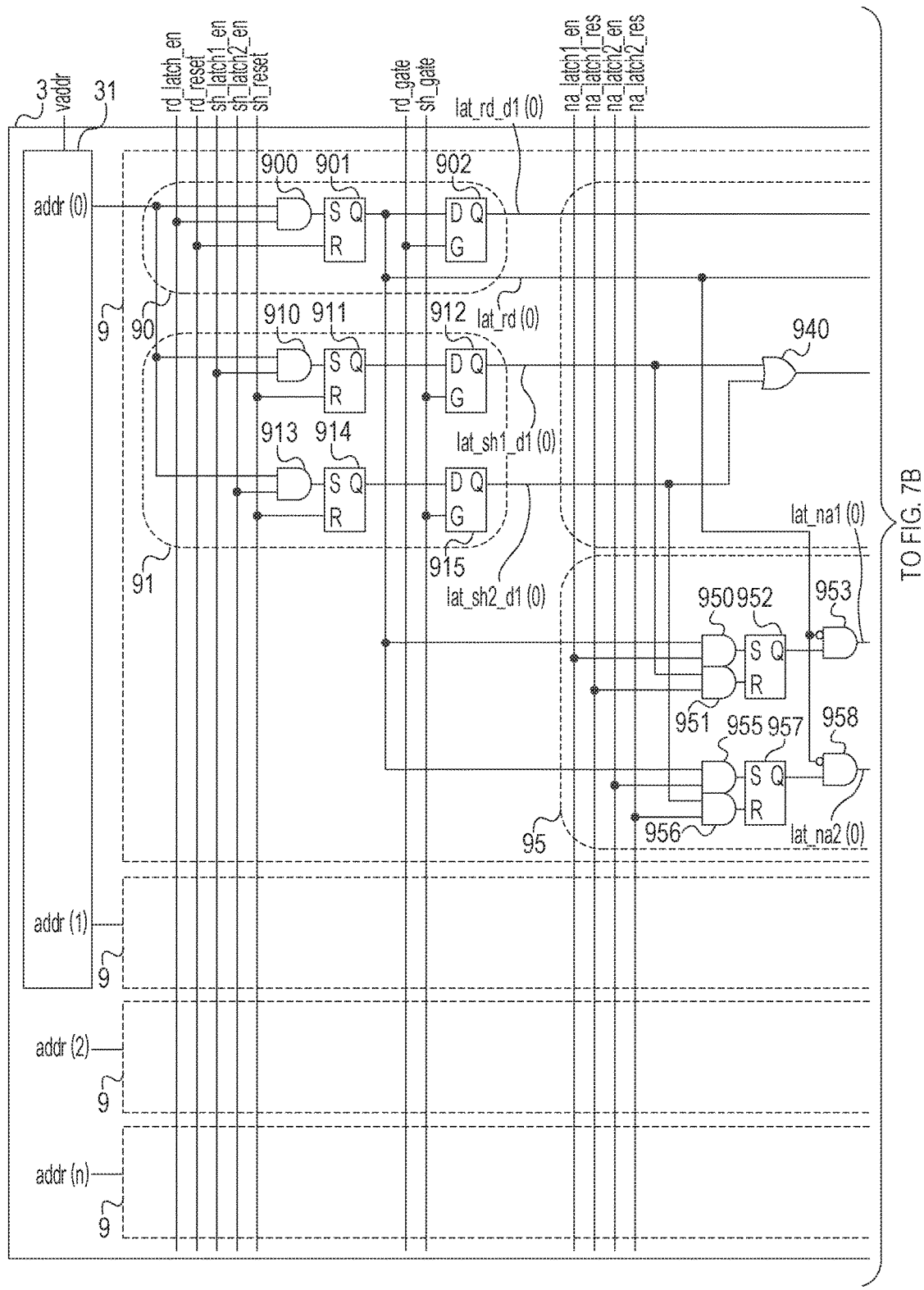
FIGS. 7A and 7B are a block diagram illustrating a vertical scanner according to a third embodiment.
Figure 7B:
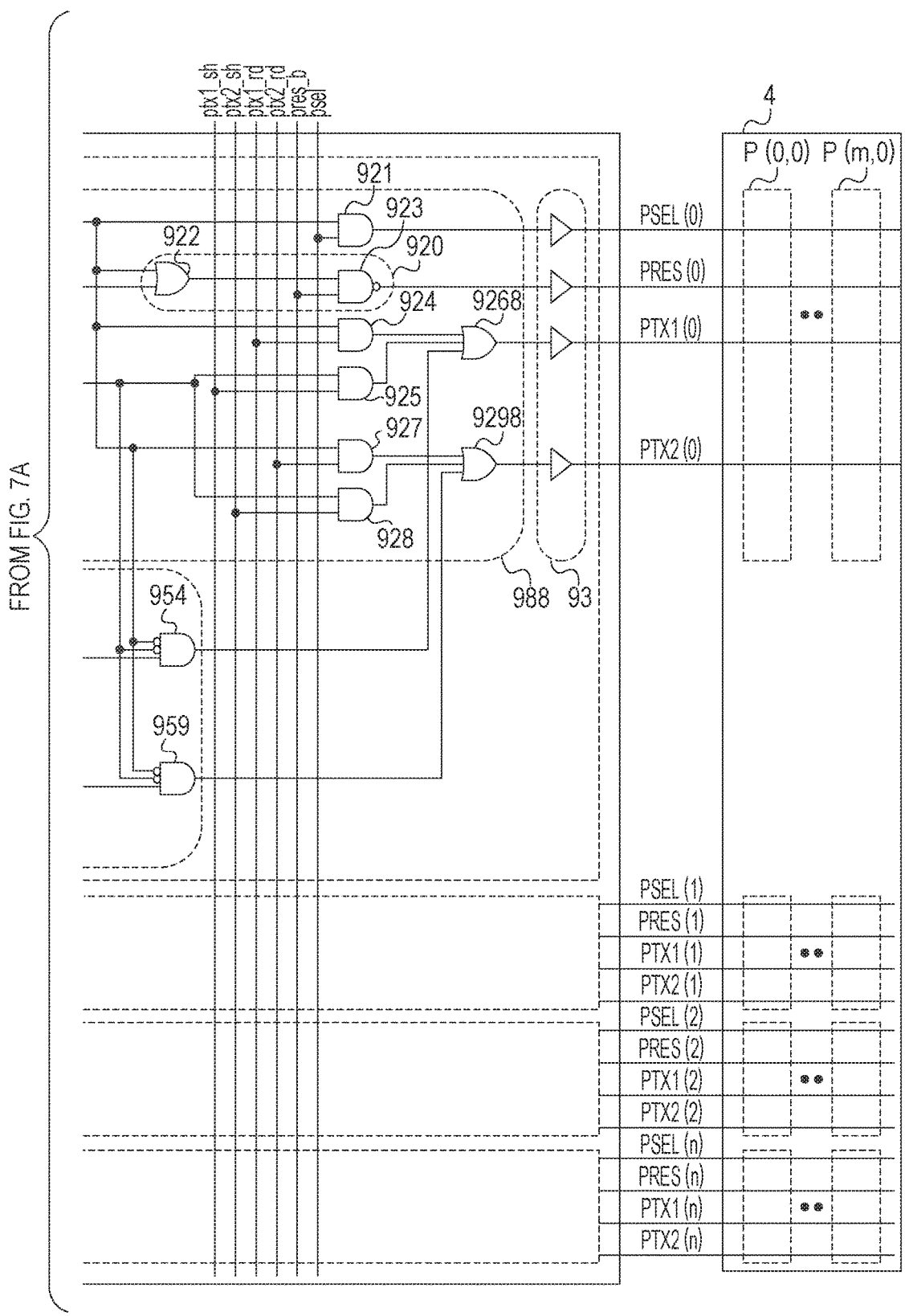

FIGS. 7A and 7B are block diagrams illustrating a vertical scanner 3 according to this embodiment. The vertical scanner 3 of this embodiment is different from the vertical scanner 3 of the first embodiment in configurations of calculators 988 and 95. Note that a controller 2 of this embodiment generates, in addition to the control signals generated by the controller 2 of the first embodiment, control signals na_latch1_en, na_latch2_en, na_latch1_res, and na_latch2_res to be input to the calculator 95. The signals ptx_sh of the first embodiment is generated as two signals, that is, signals ptx1_sh and ptx2_sh to be input to the calculator 988.

In the calculator 988, a two-input OR circuit 940 receives an output from a D latch 912 and an output from a D latch 915. Furthermore, the signals ptx1_sh and ptx2_sh are supplied to two-input AND circuits 925 and 928, respectively. Furthermore, three-input OR circuits 9268 and 9298 receive respective signals supplied from the calculator 95.

A configuration of the calculator 95 will now be described. First, a two-input AND circuit 950 receives a signal output from the SR latch 901 and the signal na_latch1_en. A two-input AND circuit 951 receives a signal output from the D latch 912 and the signal na_latch1_res. Furthermore, a signal output from the two-input AND circuit 950 is supplied to a set terminal S of an SR latch 952. Similarly, a signal output from the two-input AND circuit 951 is supplied to a reset terminal R. Specifically, when an address signal in a read-out target row stored in the SR latch 901 has a value "1" and the signal na_latch1_en has a value "1", the SR latch 952 is set and outputs "1". When an address signal in a shutter target row stored in the SR latch 912 has a value "1" and the signal na_latch1_res has a value "1", the SR latch 952 is reset and outputs "0". That is, when an address of a read-out target row is selected, the SR latch 952 outputs "1" whereas when an address of a shutter target row is selected, the SR latch 952 outputs "0".

Thereafter, a reversal signal of the signal output from the SR latch 901 and the signal output from the SR latch 952 are supplied to a two-input AND circuit 953. By this, while the SR latch 901 outputs "1", that is, during the "state P", the two-input AND circuit 953 forcibly outputs "0" irrespective of an output of the SR latch 952 (a signal lat_na1(0) in FIG. 7B).

Thereafter, an output of the two-input AND circuit 953 (the signal lat_na1(0)) is supplied to an input of a three-input AND circuit 954. Furthermore, the other inputs of the AND circuit 954 receive a reversal signal of an output of the two-input OR circuit 940 and a reversal signal of an output of the D latch 902. Accordingly, the signal lat_na1(0) is enabled when an address does not indicate a read-out target row or a shutter target row.

Furthermore, a two-input AND circuit 955 receives the signal output from the SR latch 901 and the signal na_latch2_en similarly to the case described above. The two-input AND circuit 956 receives a signal output from the D latch 915 and the signal na_latch2_res. Furthermore, a signal output from the two-input AND circuit 955 is supplied to a set terminal S of an SR latch 957. Similarly, a signal output from the two-input AND circuit 956 is supplied to a reset terminal R. Specifically, when an address signal in a read-out target row stored in the SR latch 901 is "1" and the signal na_latch2_en is "1", the SR latch 957 is set and outputs "1". When an address signal in a shutter target row stored in the SR latch 915 is "1" and the signal na_latch2_res is "1", the SR latch 957 is reset and outputs "0".

Subsequently, a reversal signal of the signal output from the SR latch 901 and a signal output from the SR latch 957 are supplied to a two-input AND circuit 958.

Thereafter, an output of the two-input AND circuit 958 (the signal lat_na2(0)) is supplied to an input of a three-input AND circuit 959. Furthermore, the other inputs of the AND circuit 959 receive a reversal signal of the output of the two-input OR circuit 940 and a reversal signal of the output of the D latch 902.

Operations of the circuits are the same as those described above, and therefore, descriptions thereof are omitted.

Outputs from the three-input AND circuits 954 and 959 are supplied to the three input OR circuits 9268 and 9298 included in the calculator 988, respectively. By this, a signal output from the calculator 95 is enabled when an address is not specified as a read-out target row or a shutter target row.

Figure 8A:
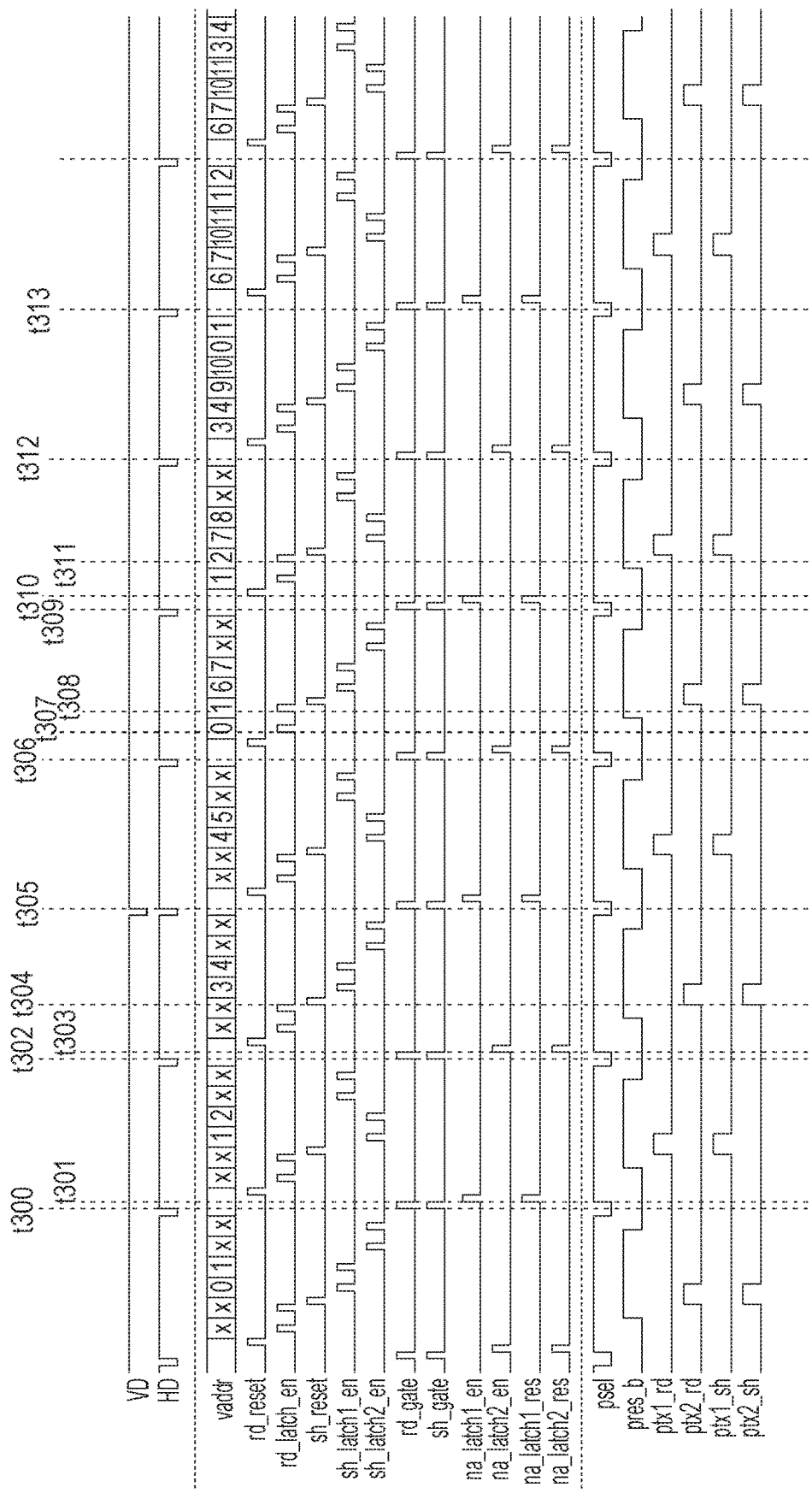
Figure 8C:
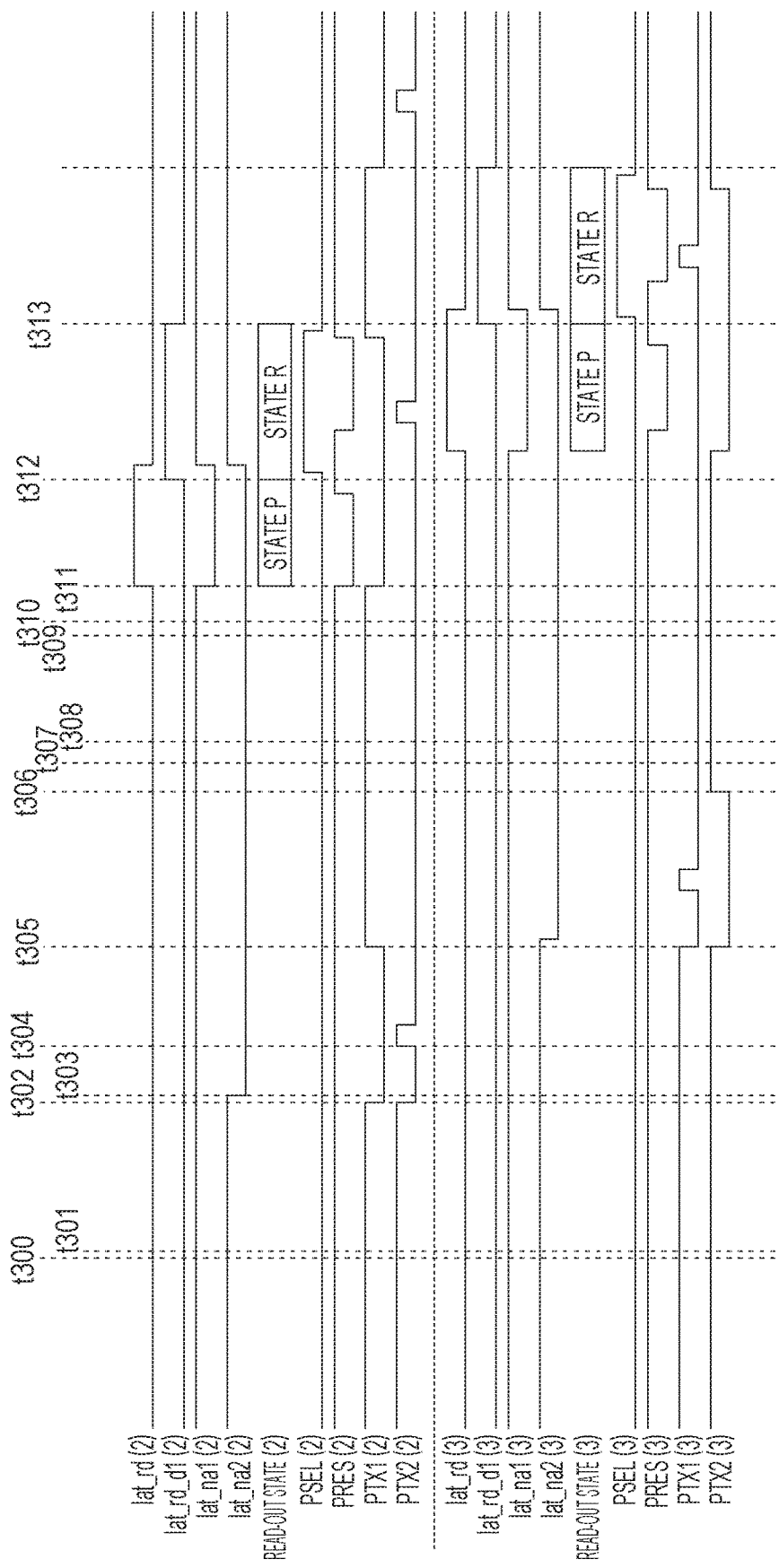

FIGS. 8A to 8C are timing charts illustrating a method for driving the vertical scanner 3 and a pixel area 4 of this embodiment. In this driving method, an operation of thinning out one row for every three rows is performed, for example. The driving method has been described in detail with reference to FIGS. 4A to 4C, and therefore, only operations associated with this embodiment will be described. Furthermore, descriptions of driving signals PSEL(x) and PRES(s) are also omitted.

Before a time point t300, the output signal lat_na1(0) to an output signal lat_na1(n) have a value "1" at the start. Similarly, the output signal lat_na2(0) to an output signal lat_na2(n) have a value "1" at the start. These situations may be realized by performing an OR operation of a signal which enables all addresses addr(0) to addr(n) and a Q output from the SR latch 901. However, this is not a characteristic of the disclosure, and therefore, such a configuration is not illustrated.

Furthermore, an address is not specified as a read-out target row or a shutter target row before the time point t300. Therefore, the three-input AND circuits 954 and 959 output signals lat_na(0) to lat_na(n) having a value "1" as the signals PTX1(0) to PTX1(n) and PTX2(0) to PTX2(n).

At the time point t300, when the signal lat_sh1_d1(0) has a value "1", the two-input AND circuit 925 is enabled and the signal ptx1_sh, that is, "0", is output as the signal PTX1(0). Similarly, the two-input AND circuit 928 is enabled and the signal ptx2_sh, that is, "0", is output as the signal PTX2(0).

Furthermore, the signal lat_sh1_d1(1) has a value of "1", and "0" is similarly output as signals PTX1(1) and PTX2(1).

At a time point t301, when the signal lat_sh1_d1(0) has a value "1" and the signal na_latch1_res has a value of "1", the two input AND circuit 951 outputs "1", the SR latch 952 is reset, and the output signal lat_na1(0) has a value "0". The signal lat_na2(0) maintains the value "1".

At a time point t302, when the signal lat_sh1_d1(0) has a value "0", the three-input AND circuit 954 is enabled and outputs a signal supplied from the two-input AND circuit 953. Furthermore, the three-input AND circuit 959 is enabled and outputs a signal supplied from the two-input AND circuit 958. Specifically, the output signal PTX1(0) has a value "0" and the output signal PTX2(0) has a value "1".

Furthermore, when a signal lat_sh1_d1(2), not illustrated, has a value "1", the output signals PTX1(2) and PTX2(2) have a value "0".

At a time point t303, when a signal lat_sh2_d1(1), not illustrated, has a value "1" and a signal na_latch2_res has a value "1", the SR latch 957 is reset and the output signal lat_na2(1) has a value "0". Similarly, the signal lat_na2(2) which is simultaneously selected and which has a value "0" is output.

At a time point t304, signals lat_sh2_d1(1) and lat_sh2_d1(2), not illustrated, have a value "1". Therefore, the signals ptx1_sh and ptx2_sh are output as the signals PTX1(1), PTX2(1), PTX1(2), and PTX2(2).

At a time point t305, a signal lat_sh1_d1(2), not illustrated, has a value "0" and signals lat_na1(2) and lat_na2(2) are output as the signals PTX1(2) and PTX2(2), respectively. Furthermore, a signal lat_sh1_d1(3), not illustrated, has a value "1", and signals ptx1_sh and ptx2_sh are output as signals PTX1(3) and PTX2(3), respectively.

Similarly, at a time point t306, a signal lat_sh1_d1(3) has a value "0" and signals lat_na1(3) and lat_na2(3) are output as the signals PTX1(3) and PTX2(3), respectively.

At a time point t307, an address is specified as a read-out target row, and a signal output from the SR latch 901 (lat_rd(0)) has a value "1". By this, the two-input AND circuits 953 and 958 output a value "0" and the output signals lat_na1(0) and lat_na2(0) have a value "0". Furthermore, at this time point, the three-input AND circuit 954 and 959 output levels of the signals lat_na1(0) and lat_na2(0). Similarly, the two-input AND circuits 924, 925, 927, and 928 output a value "0". Therefore, the three-input OR circuit 9268 and 9298 output signals output from the three-input AND circuits 954 and 959 as the signals PTX1(0) and PTX2(0) having a value "0", respectively.

Similarly, at a time point t308, when the signal lat_rd(1) has a value "1", the output signals lat_na1(1) and lat_na2(1) forcibly have a value "0". This level is finally output as the signals PTX1(1) and PTX2(1).

Furthermore, at the time points t307 and t308, the "state P", that is, the preparatory state, is entered in individual addresses. This has been described above, and therefore, a redundant description is omitted.

In this way, since the signal PTX2(0) has a value "0" when the "state P" (the preparatory state) is entered, the state R (a read-out selection state) may be entered after states of the shared detection nodes DN are stabled.

At a time point t309, the signals lat_rd_d1(0) and lat_rd_d1(1) have a value "1". By this, the individual signals enter the "state R", that is, the read-out selection state. Furthermore, the two-output AND circuits 924 and 927 are enabled, and the signals ptx1_rd and ptx2_rd are output as the signals PTX1(0) and PTX2(0), respectively.

In a period of time from the time point t309 to the time point t310, the signal lat_rd(0) has a value "1" and the signal na_latch1_en has a value "1", and therefore, the SR latch 952 is set and outputs a value "1" as a Q output. However, since the signal lat_rd(0) input to the two-input AND circuit 954 has a value "1" in the period of time, the signal lat_na1(0) has a value "0".

Thereafter, at a time point t310, the signal lat_rd(0) has a value "0", and the two-input AND circuit 954 outputs a signal supplied from the SR latch 952. Therefore, the output signal lat_na1(0) has a value "1". The signal lat_na2(0) starts outputting a state of the value "1" which has been stored in the SR latch 957.

The signal lat_na1(1) at this time point is also the same as that described above. On the other hand, the signal lat_na2(1) outputs a "0" level stored in the SR latch 957. As the output signals PTX1(1) and PTX2(1), since the signal lat_rd_d1(1) has a value "1", the two-input AND circuits 924 and 927 output the signals ptx1_rd and ptx2_rd, respectively.

At a time point t311, the signal lat_rd(1) has a value "1". Accordingly, the output signals lat_na1(1) and lat_na2(1) have a value "0". As the output signals PTX1(1) and PTX2(1), since the signal lat_rd_d1(1) has a value "1", the signals ptx_rd1 and ptx_rd2 are output, respectively.

Similarly, the signal lat_rd(2) has a value "1", and therefore, the output signals lat_na1(2) and lat_na2(2) have a value "0". This level is output as the signals PTX1(2) and PTX2(2).

At a time point t312, the signal lat_rd_d1(0) has a value "0". Accordingly, an address is not specified in a read-out target row or a shutter target row. Therefore, levels of the signals lat_na1(0) and lat_na2(0) are output from the signals PTX1(0) and PTX2(0), respectively.

Here, the signal lat_rd_d1(2) has a value "1", and the levels of the signals ptx1_rd and ptx2_rd are output as the signals PTX1(2) and PTX2(2), respectively.

After the time point t313, the operation at the time point t300 onwards is performed, and therefore, a description of the operation at the time point t313 onwards is omitted. Furthermore, the same operation is repeatedly performed until the address signal vaddr has a value "n", and then, the read-out scan is completed.

In this embodiment, the drivers 9 in the first row among the plurality of drivers 9 output the driving signal PRES(1) which brings the reset transistors M3 included in the pixel circuits P(x, 1) in the first row into a non-conductive state in the period of time from the time point t311 to the time point t312. In this period of time, the drivers 9 in the zeroth row similarly output the driving signal PRES(0) to the pixel circuits P(x, 0) in the zeroth row. Furthermore, the drivers 9 in the first row output the driving signal PTX1(1) which brings the transfer transistors M1 of the pixel circuits P(x, 1) in the first row into a conductive state in the period of time from the time point t311 to the time point t312. In this period of time, the drivers 9 in the zeroth row similarly output the driving signal PTX1(0) to the pixel circuits P(x, 0) in the zeroth row. Furthermore, the drivers 9 in the second row among the plurality of drivers 9 output the driving signal PRES(2) which brings the reset transistors M3 included in the pixel circuits P(x, 2) in the second row into a non-conductive state in the period of time from the time point t311 to the time point t312. Furthermore, in this period of time, the drivers 9 in the second row output the driving signal PTX1(2) which brings the first transfer transistors M1 of the pixel circuits P(x, 2) into a non-conductive state. The drivers 9 in the second row output the driving signal PRES(2) which brings the reset transistors M3 included in the pixel circuits P(x, 2) into a non-conductive state in the period of time from the time point t312 to the time point t313 which is after the period of time from the time point t311 to the time point t312. Furthermore, the drivers 9 in the second row output the driving signal PTX(2) which brings the second transfer transistors M2 included in the pixel circuits P(x, 2) in the second row into a conductive state in the period of time from the time point t312 to the time point t313. The drivers 9 in the first row output the driving signal PRES(1) which brings the reset transistors M3 included in the pixel circuits P(x, 1) into a non-conductive state in the period of time from the time point t312 to the time point t313. Furthermore, the drivers 9 in the first row output the driving signal PTX2(1) which brings the second transfer transistors M2 included in the pixel circuits P(x, 1) into a conductive state in the period of time from the time point t312 to the time point t313.

In particular, according to this embodiment, the vertical scanner 3 writes the decoded value obtained by the address decoder 31 into the SR latch 901, and thereafter, writes an output value of the SR latch 901 into the D latch 902. The calculator 92 receives the output value of the SR latch 901 and an output value of the D latch 902 so as to determine a read-out state of the pixel circuits P in accordance with the output values. In this way, the calculator 92 may generate a driving signal corresponding to each state. Since the decoded value of the address decoder 31 is written in the SR latch 901 in a time sharing manner, "1" may be written to the SR latches 901 in the plurality of rows. Accordingly, the plurality of rows may simultaneously enter the same read-out state of the pixel circuits P. Then the writing to the SR latch 901 and the writing to the D latch 902 are performed in parallel so that the plurality of rows may be selected in different states before being driven.

According to this embodiment, when the read-out state of the pixel circuits P is the "state P", the signal PTX may be controlled in advance. By this, among the shared detection nodes DN, a state corresponding to "0" may be set in advance to the detection nodes DN in the rows which are thinned out and which are not read out, and the process may be performed with the stable detection nodes DN in the read-out target rows in the "state R".

According to the embodiments described above, an imaging apparatus corresponding to an operation mode which is advantageous for improvement of performance of the imaging apparatus may be provided. The present disclosure may be appropriately modified without departing from the technical scope. Furthermore, all things which are apparent from the circuit diagrams and the timing charts in the drawings in this description are included in the disclosure. The connection relationships of the circuits and driving timings, and lengths of the periods are apparent from the drawings. The all items disclosed in the present disclosure are useful for realizing operations which are advantageous for improvement of performance of the imaging apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-130906 filed Jun. 30, 2016, which is hereby incorporated by reference herein in its entirety.

What is claimed is:

1. An imaging apparatus comprising:
a pixel area including a plurality of pixel circuit groups each of which includes a plurality of pixel circuits;
a plurality of drivers arranged so as to correspond to the different pixel circuit groups and configured to output driving signals to the corresponding pixel circuit groups; and
an address decoder configured to supply logical values indicating selection or deselection of the individual drivers to the drivers,
wherein each of the drivers includes
a first holding circuit configured to hold and output a logical value based on a logical value supplied from the address decoder,
a second holding circuit configured to hold and output a logical value based on the logical value output from the first holding circuit, and
a calculator configured to receive the logical values supplied from the first and second holding circuits and perform a logical operation for generating one of the driving signals.

2. The imaging apparatus according to claim 1, further comprising:
a controller configured to generate control signals to be supplied to the drivers,
wherein the calculator includes
a first calculator configured to receive a first control signal generated by the controller, the logical value output from the first holding circuit, and the logical value output from the second holding circuit and perform a logical operation for generating a first driving signal serving as one of the driving signals, and
a second calculator configured to receive a second control signal generated by the controller and the logical value output from the second holding circuit and perform a logical operation for generating a second driving signal serving as one of the driving signals.

3. The imaging apparatus according to claim 1, further comprising:
a controller configured to generate control signals to be supplied to the drivers,
wherein the calculator includes
an OR circuit configured to output a logical sum of the logical value output from the first holding circuit and the logical value output from the second holding circuit, and
an NAND circuit configured to output a reversal value of a logical product of the logical value output from the OR circuit and a first control signal generated by the controller.

4. The imaging apparatus according to claim 1, further comprising:
a controller configured to generate control signals to be supplied to the drivers,
wherein the calculator includes an AND circuit configured to output a logical product of the logical value output from the second holding circuit and a second control signal generated by the controller.

5. The imaging apparatus according to claim 1, wherein the first holding circuit includes an SR latch.

6. The imaging apparatus according to claim 5, wherein the second holding circuit includes a D latch.

7. The imaging apparatus according to claim 1, wherein the second holding circuit includes a plurality of latches connected to an input terminal and an output terminal of the second holding circuit in series.

8. The imaging apparatus according to claim 7, wherein the plurality of latches is D latches.

9. The imaging apparatus according to claim 7, further comprising:
a controller configured to generate control signals to be supplied to the drivers,
wherein the latches include a first latch configured to hold and output the logical value supplied to the second holding circuit and a second latch configured to hold and output the logical value supplied from the first latch, and
the calculator includes
a first calculator configured to receive a first control signal generated by the controller, the logical value output from the first holding circuit, and the logical value output from the first latch and perform a logical operation for generating a first driving signal serving as one of the driving signals, and
a second calculator configured to receive a second control signal generated by the controller and the logical value output from the second latch and perform a logical operation for generating a second driving signal serving as one of the driving signals.

10. The imaging apparatus according to claim 9, further comprising:
a controller configured to generate control signals to be supplied to the drivers,
wherein the latches include a first latch configured to hold and output the logical value supplied to the second holding circuit and a second latch configured to hold and output the logical value supplied from the first latch, and
the calculator includes
an OR circuit configured to output a logical sum of the logical value supplied from the first holding circuit and the logical value supplied from the second latch, and
an NAND circuit configured to output a reversal value of a logical product of the logical value supplied from the OR circuit and the first control signal generated by the controller.

11. The imaging apparatus according to claim 9, wherein the calculator includes an AND circuit configured to output a logical product of the logical value output from the second latch and the second control signal generated by the controller.

12. The imaging apparatus according to claim 1, wherein each of the pixel circuits includes
a first photoelectric conversion element,
a second photoelectric conversion element,
a node connected through a first transfer transistor to the first photoelectric conversion element and connected through a second transfer transistor to the second photoelectric conversion element,
an amplification transistor connected to the node, and
a reset transistor connected to the node.

13. The imaging apparatus according to claim 12,
wherein, in a first period, a part of the drivers output a driving signal which brings the reset transistors from a conductive state through a non-conductive state into a conductive state,
in a second period following the first period, a part of the drivers output a driving signal which brings the reset transistors from a conductive state through a non-conductive state into a conductive state, and
in a third period following the second period, a part of the drivers output a driving signal which brings the reset transistors from a conductive state through a non-conductive state into a conductive state.

14. The imaging apparatus according to claim 13,
wherein a part of the drivers output a driving signal which brings the first transfer transistors into a conductive state while the reset transistors are in the non-conductive state in the second period, and a part of the drivers output a driving signal which brings the second transfer transistors into a conductive state while the reset transistors are in the non-conductive state in the third period.

15. The imaging apparatus according to claim 13, wherein a first driver which is one of the drivers outputs, at a certain time point, a driving signal which brings a reset transistor of a first pixel circuit corresponding to the first driver into a non-conductive state and a driving signal which brings a first transfer transistor of the first pixel circuit into a conductive state, and a second driver which is one of the drivers outputs, at the certain time point, a driving signal which brings a reset transistor of a second pixel circuit corresponding to the second driver into a non-conductive state and a driving signal which brings a first transfer transistor of the second pixel circuit into a non-conductive state.

16. The imaging apparatus according to claim 15, wherein the second driver outputs, at a time point after the certain time point, a driving signal which brings the reset transistor of the second pixel circuit into a non-conductive state and a driving signal which brings the second transfer transistor of the second pixel circuit into a conductive state.

17. The imaging apparatus according to claim 15, wherein the first driver outputs, at the time point after the certain time point, a driving signal which brings the reset transistor of the first pixel circuit into a non-conductive state and a driving signal which brings the second transfer transistor of the first pixel circuit into a conductive state.

18. The imaging apparatus according to claim 1,
wherein each of the drivers includes
a third holding circuit configured to hold and output a logical value based on the logical value output from the first holding circuit, and
an AND circuit configured to output a logical product of an reversal value of the logical value output from the first holding circuit and the logical value output from the third holding circuit.

19. An imaging system including the imaging apparatus according to claim 1, the imaging system comprising at least one of:
an optical system configured to form an image in the imaging apparatus;
a control apparatus configured to control the imaging apparatus;
a processing apparatus configured to process a signal output from the imaging apparatus;
a display apparatus configured to display an image obtained by the imaging apparatus; and
a storage apparatus configured to store the image obtained by the imaging apparatus.

* * * * *